US009826563B2

(12) United States Patent
Sheng

(10) Patent No.: US 9,826,563 B2
(45) Date of Patent: *Nov. 21, 2017

(54) METHOD AND APPARATUS FOR SIDELINK DIRECT DISCOVERY RESOURCE POOL ALLOCATION FOR OUT-OF-COVERAGE WIRELESS TERMINAL

(71) Applicant: Sharp Kabushiki Kaisha, Sakai, Osaka (JP)

(72) Inventor: Jia Sheng, Vancouver, WA (US)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/092,788

(22) Filed: Apr. 7, 2016

(65) Prior Publication Data

US 2016/0302249 A1    Oct. 13, 2016

Related U.S. Application Data

(60) Provisional application No. 62/145,492, filed on Apr. 9, 2015, provisional application No. 62/145,497, filed on Apr. 9, 2015.

(51) Int. Cl.
| | |
|---|---|
| H04W 4/00 | (2009.01) |
| H04W 8/00 | (2009.01) |
| H04W 72/00 | (2009.01) |
| H04W 76/02 | (2009.01) |
| H04W 72/02 | (2009.01) |

(52) U.S. Cl.
CPC ......... *H04W 76/023* (2013.01); *H04W 4/005* (2013.01); *H04W 8/005* (2013.01); *H04W 72/02* (2013.01)

(58) Field of Classification Search
CPC .................. H04W 76/023; H04W 4/005
See application file for complete search history.

(56) References Cited

U.S. PATENT DOCUMENTS

| | | | |
|---|---|---|---|
| 9,002,281 | B2 | 4/2015 | Fwu |
| 2006/0036518 | A1 | 2/2006 | O'Neill |
| 2007/0223428 | A1 | 9/2007 | Patterson et al. |
| 2013/0109301 | A1 | 5/2013 | Hakola et al. |
| 2013/0128823 | A1 | 5/2013 | Turtinen et al. |
| 2013/0273923 | A1 | 10/2013 | Li et al. |
| 2013/0288608 | A1 | 10/2013 | Fwu |

(Continued)

FOREIGN PATENT DOCUMENTS

| | | |
|---|---|---|
| WO | 2013/177449 A1 | 11/2013 |
| WO | 2014/182342 A1 | 11/2014 |
| WO | 2015/003365 A1 | 1/2015 |

OTHER PUBLICATIONS

3GPP TS 36.213 V12.4.0; Technical Specification; $3^{rd}$ Generation Partnership Project; Technical Specification Group Radio Access Network; Evolved Universal Terrestrial Radio Access (E-UTRA); Physical Layer Procedures (Release 12) (Dec. 2014).

(Continued)

*Primary Examiner* — Lewis West
(74) *Attorney, Agent, or Firm* — Nixon & Vanderhye P.C.

(57) ABSTRACT

Alternative techniques for providing out-of-coverage radio resources to out-of-coverage wireless terminals are provided. The alternative techniques may be used individually or in combination.

10 Claims, 14 Drawing Sheets

(56) References Cited

U.S. PATENT DOCUMENTS

| | | | |
|---|---|---|---|
| 2014/0126509 A1 | 5/2014 | You | |
| 2014/0328329 A1 | 11/2014 | Novlan et al. | |
| 2015/0016355 A1 | 1/2015 | Yie et al. | |
| 2015/0043448 A1* | 2/2015 | Chatterjee | H04W 8/005 370/329 |
| 2015/0215903 A1* | 7/2015 | Zhao | H04W 72/04 370/329 |
| 2015/0271720 A1* | 9/2015 | Yamada | H04W 76/023 370/331 |
| 2015/0271841 A1* | 9/2015 | Yamada | H04W 76/023 370/329 |
| 2015/0271846 A1* | 9/2015 | Kowalski | H04W 72/14 370/329 |
| 2015/0319797 A1* | 11/2015 | Yamada | H04W 72/14 370/329 |
| 2015/0327240 A1* | 11/2015 | Yamada | H04W 72/048 455/426.1 |
| 2015/0339718 A1 | 11/2015 | Walton | |
| 2015/0341794 A1 | 11/2015 | Vanderveen | |
| 2015/0382324 A1 | 12/2015 | Sheng et al. | |
| 2016/0095092 A1* | 3/2016 | Khoryaev | H04W 8/005 370/329 |
| 2016/0095112 A1* | 3/2016 | Panteleev | H04L 1/1614 370/329 |
| 2016/0135200 A1 | 5/2016 | Brahmi | |
| 2016/0234718 A1* | 8/2016 | Thangarasa | H04W 8/005 |
| 2016/0249198 A1* | 8/2016 | Kim | H04W 48/16 |
| 2016/0255615 A1 | 9/2016 | Chatterjee | |

OTHER PUBLICATIONS

R2-150734, 3GPP TSG-RAN2 #89 meeting; Samsung, "Introduction of ProSe", Athens, Greece, Feb. 9-13, 2015.
R2-150645, 3GPP TSG-RAN WG2 Meeting #89; Intel Corporation, Fujitsu, InterDigital, Huawei, HiSilicon, ZTE, "Corrections to Stage 2 Description of ProSe"; Athens, Greece, Feb. 9-13, 2015.
3GPP TS 23.303 V12.3.0; Technical Specification; 3$^{rd}$ Generation Partnership Project; Technical Specification Group Services and System Aspects; Proximity-based Services (ProSe); Stage 2 (Release 12) (Dec. 2014).
3GPP TS 36.843 V12.0.1; Technical Report; 3$^{rd}$ Generation Partnership Project; Technical Specification Group Radio Access Network; Study on Lte Device to Device Proximity Services; Radio Aspects (Release 12) (Mar. 2014).
International Search Report and Written Opinion dated Jul. 12, 2016 in PCT Application No. PCT/US2016/026439.
International Search Report and Written Opinion dated Jul. 7, 2016 in PCT Application No. PCT/US2016/026320.
International Search Report and Written Opinion dated Nov. 19, 2015 in PCT Application No. PCT/US15/37650.
R2-142829, 3GPP TSG-RAN2 Meeting #86, "Introduction of ProSe", Samsung, Qualcom Incorporation, Seoul, South Korea, May 19-23, 2014.
R1-141256, 3GPP TSG RAN WG1 Meeting #76bis, "Distributed Resource Allocation for D2D Communication", Alcatel-Lucent Shanghai Bell, Alcatel-Lucent, Shen Zhen, China, Mar. 31-Apr. 4, 2014.
R1-141546, 3GPP TSG RAN WG1 Meeting #76bis, Discussion on D2D Operation Outside of Network Coverage (Mode-2), Intel Corporation, Shenzhen, China, Mar. 31-Apr. 4, 2014.
R1-141859, 3GPP TSG RAN WG1 Meeting #76bis, "Way Forward on Discovery Signal Design and Network Assistance", NTT DOCOMO, Huawei, HiSilicon, Samsung, Sony, Sharp, ZTE, LG Electronics, Hitachi, ETRI, Media Tek, Shenzhen, China, Mar. 31-Apr. 4, 2014.
3GPP TS 23.303 V12.0.0 Technical Specification, 3$^{rd}$ Generation Partnership Project; Technical Specification Group Services and Systems Aspects; Proximity-based Services (ProSe); Stage 2 (Release 12) (Feb. 2014).
R2-14XXX, 3GPP TSG RAN WG1 Meeting #87, Introduction of ProSe, Samsun, Dresden, German, Aug. 18-22, 2014.
U.S. Appl. No. 14/660,622, filed Mar. 17, 2015, entitled "Device-To-Device Communications Apparatus and Methods".
3GPP TS 36.331 V12.1.0 Technical Specification, 3$^{rd}$ Generation Partnership Project; Technical Specification Group Radio Access Network; Evolved Universal Terrestrial Radio Access (E-UTRA); Radio Resource Control (RRC) Protocol Specification (Release 12) (Mar. 2014).
U.S. Appl. No. 15/092,996, filed Apr. 7, 2016, entitled Method and Apparatus for Implementing Partial Coverage and Out-Of-Coverage Sidelink Discovery Resource Pools for Wireless Communications.
Office Action dated Oct. 7, 2016 in U.S. Appl. No. 14/749,898.
Office Action dated Oct. 11, 2016 in U.S. Appl. No. 15/092,996.
R1-141969 3GPP TSG-RAN WG1 #77, Qualcomm Incorporated, "Resource Allocation for Mod 2 D2D Broadcast Communication", Seoul, Korea, May 19-23, 2014.
R1-150962 3GPP TSG-RAN WG1 Meeting #80, Change Request, Athens, Greece, Feb. 9-13, 2015.
Notice of Allowance dated May 24, 2017 in U.S. Appl. No. 15/092,996.
Office Action dated Sep. 15, 2017 in U.S. Appl. No. 14/749,898.

\* cited by examiner

METHOD AND APPARATUS FOR SIDELINK DIRECT DISCOVERY RESOURCE POOL ALLOCATION FOR OUT-OF-COVERAGE WIRELESS TERMINAL

This application claims the priority and benefit of the following United States Provisional applications, both of which are incorporated herein by reference in their entirety: (1) U.S. Provisional application 62/145,492 filed Apr. 9, 2015 and entitled "METHOD AND APPARATUS FOR SIDELINK DIRECT DISCOVERY RESOURCE POOL ALLOCATION FOR OUT-OF-COVERAGE WIRELESS TERMINAL"; and (2) U.S. Provisional application 62/145,497 filed on Apr. 9, 2015 and entitled "METHOD AND APPARATUS FOR IMPLEMENTING PARTIAL COVERAGE AND OUT-OF-COVERAGE SIDELINK DISCOVERY RESOURCE POOLS FOR WIRELESS COMMUNICATIONS".

TECHNICAL FIELD

The technology relates to wireless communications, and particularly to allocating or granting radio resources for wireless device-to-device (D2D) or sidelink communications, and more particularly to providing resources for sidelink direct discovery.

BACKGROUND

When two wireless terminals (e.g., UEs or mobile communication devices) of a cellular network or other telecommunication system communicate with each other, their data path has historically gone through the operator network. The data path through the network may include base stations and/or gateways. If the wireless terminals are in close proximity with each other, their data path may be routed locally through a local base station. In general, communications between a network node such as a base station and a wireless terminal is known as "WAN" or "Cellular communication".

It is also possible for two wireless terminals in close proximity to each other to establish a link with one another without the need to go through a base station. Telecommunications systems may use or enable such device-to-device ("D2D") communication, in which two or more user equipment terminals communicate with one another. In D2D communication, voice and data traffic (referred to herein as "communication signals") from one user equipment terminal may be transmitted to one or more other user equipment terminals may without the communication signals passing through a base station or other network control device of a telecommunication system. As such, device-to-device (D2D) communications differ from "WAN" or "Cellular communication". Device-to-device (D2D) communication has more recently also become known as "sidelink direct communication".

Sidelink direct communication may be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for present and future generation wireless communication systems. The 3GPP may define specifications for next generation mobile networks, systems, and devices. The 3GPP LTE is the name given to a project to improve the Universal Mobile Telecommunications System ("UMTS") mobile phone or device standard to cope with future requirements. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which D2D communication may be used.

A non-exhaustive list of 3GPP documents which describe, at least in part, device-to-device (D2D) communication (e.g.,"sidelink direct communication"), and which may be pertinent to the technology disclosed herein, include the following (all of which are incorporated herein by reference in their entireties):

R2-150645, 3GPP TSG-RAN WG2 Meeting #89, Athens, Greece, Feb. 9-13, 2015, Corrections to Stage 2 Description of ProSe ("R2-150645").

R1-150962, Introduction of D2D (ProSe) feature into 3GPP TS 36.213 V12.4.0 (2014-12), ("R1-150962").

R2-150734, 3GPP TSG-RAN2#89 meeting Athens, Greece, 9-13 Feb. 2015, change request to 36.331 V.14.4.1 ("R2-150734").

3GPP TS 23.303 V12.4.0 (2015-03), 3rd Generation Partnership Project; Technical Specification Group Radio Access Network; Evolved Universal Terrestrial Radio Access (E-UTRA); Physical layer procedures; (Release 12).

3GPP TS 36.843 V12.0.1 (2014-03), 3rd Generation Partnership Project; Technical Specification Group Radio Access Network; Study on LTE Device to Device Proximity Services; Radio Aspects.

R2-150645 §23.10.3 describes, e.g., radio resource allocation for Proximity Service, and in particular two modes of resource allocation known as the scheduled resource allocation mode and the autonomous resource selection mode. As described in §23.10.3, scheduled resource allocation is characterized by the wireless terminal (UE) being in RRC_CONNECTED mode in order to transmit data, and the wireless terminal (UE) requesting transmission resources from the eNodeB (after which the eNB schedules transmission resources for transmission of Sidelink Control and data). On the other hand, UE autonomous resource selection is characterized by a UE on its own selecting resources from resource pools and performing transport format selection to transmit Sidelink Control and data.

R2-150645 §23.10.3 further describes, e.g., that a UE is considered in-coverage for ProSe Direct Communication whenever it detects a cell on a Public Safety ProSe Carrier in accordance with specified criteria. R2-150645 §23.10.3 also discusses resource selection/allocation rules; what happens when a UE that is camped or connected to one carrier frequency but interested in ProSe Direct Communication in another carrier frequency; and certain selection options for a cell on the Public Safety ProSe carrier.

R2-150645 §23.10.3.1 describes, e.g., resource pools for sidelink control, both for when a wireless terminal is out-of-coverage and within coverage. For an out-of-coverage UE, the resources pools used for reception and transmission are pre-configured. For an in coverage UE, the reception resource pool and the transmission resource pool are configured by the eNodeB. R2-150645 §23.10.3.2 describes, e.g., resource pools for sidelink data.

R2-150645 §23.10.3.1 describes, e.g., support for ProSe Direct Discovery. ProSe Direct Discovery is a procedure used by the UE to discover other wireless terminals (e.g., UEs) in its proximity, using E-UTRA direct radio signals via the PC5 interface. ProSe Direct Discovery is only supported when the UE is served by E-UTRAN. R2-150645 §23.10.3.1 explains, e.g., that an upper layer (e.g., ProSe Protocol) handles authorization for announcement and monitoring of discovery messages. The ProSe Protocol layer is above the medium access control (MAC) layer, which in turn is above the physical layer. Such is also described in R2-150645 §23.11.2, which pertains to radio protocol architecture.

R2-150645 §23.11.3 describes, e.g., two types of resource allocation for a discovery message announcement (UE autonomous resource selection and scheduled resource allocation) and characteristics of both types of resource allocation.

R2-150645 §23.11.3 also states that, for UEs in RRC_IDLE, the eNodeB may selection one of two options. The first option is that the eNB may provide a resource pool for UE autonomous resource selection based discovery message announcement in system information block (SIB 19), and UEs that are authorized for Prose Direct Discovery use these resources for announcing discovery message in RRC_IDLE. The second option is that the eNB may indicate in SIB 19 that it supports ProSe Direct Discovery but does not provide resources for discovery message announcement, in which case the UEs need to enter RRC_CONNECTED in order to request resources for discovery message announcement.

R2-150645 §23.11.3 also states, e.g., that for UEs in RRC_CONNECTED, the eNB may configure the UE with a resource pool for UE autonomous resource selection for discovery message announcement via dedicated signaling. The resources allocated by the eNB via dedicated signalling are valid until the eNB re-configures the resource(s) by RRC signalling or the UE enters RRC_IDLE. Authorized receiving UEs in RRC_IDLE and RRC_CONNECTED may monitor resource pools used for UE autonomous resource selection and resource pools for scheduled resource allocation. The eNB provides the resource pool configuration used for discovery message monitoring in SIB 19. The SIB 19 may contain detailed ProSe Direct Discovery configuration used for announcing in neighbour cells of intra-frequency as well.

R2-150645 §23.11.3 further states, e.g., that a UE if authorized by the network (NW) can announce discovery message only on a serving cell. The UE can monitor discovery resources in the same as well as other frequencies than the serving cell, in same or different PLMNs. The serving cell may provide in SIB 19 a list of frequencies along with PLMN ID on which the UE may aim to monitor discovery message. An RRC_CONNECTED UE sends a ProSe UE Information indication to the serving cell if it is interested or no longer interested in intra-frequency, inter-frequency or inter-PLMN discovery message monitoring.

R1-150962 describes, e.g., physical sidelink discovery channel procedures. Among the procedures described are a UE procedure for transmitting the PSDCH (§14.3.1); a UE procedure for receiving the PSDCH (§14.3.2); and a UE procedure for determining resource block pool and subframe pool for sidelink discovery (§14.3.3).

R2-150734 describes, e.g., certain ProSe discovery related information, such as actions upon reception of SystemInformationBlockType19 (§5.2.2.x2); conditions for establishing RRC connection for sidelink direct communication/discovery (§5.3.3.1a), and sidelink dedicated configuration (§5.3.10x). In addition, R2-150734 provides, e.g., an introduction to sidelink (§5.x et seq), including conditions for sidelink operation and sidelink UE information (initiation, actions related to transmission of SidelinkUEInformation message, direct discovery monitoring, and direct discovery announcement), as well as sidelink pre-configured parameters (§9.x).

3GPP TS 23.303 V12.4.0 (2015-03) provides an overview of ProSe Direct Discovery (§5.3.1.1), including ProSe Direct Discovery Models A and B.

Generally, there are three scenarios which may occur in sidelink discovery. Those three sidelink direct discovery scenarios are illustrated in FIG. 1. A first of the sidelink discovery scenario is an "in coverage" discovery scenario, illustrated as SL discovery between UE1 and UE2 of FIG. 1, in which both UE1 and UE2 are within coverage of the radio access network. A second sidelink discovery scenario is a "partial coverage" discovery scenario, illustrated as SL discovery between UE2 and UE3 of FIG. 1. In the "partial coverage" sidelink discovery scenario the wireless terminal UE2 is within coverage of the radio access network, but the wireless terminal UE3 is out-of-coverage of the radio access network. A third sidelink discovery scenario is an "out-of-coverage" discovery scenario, illustrated as SL discovery between wireless terminal UE3 and wireless terminal UE4 of FIG. 1. In the out-of-coverage sidelink discovery scenario both the wireless terminal UE3 and the wireless terminal UE4 are out-of-coverage of the radio access network.

The three sidelink discovery scenarios are described with reference to whether or not a participating wireless terminals (e.g., UEs) are "in coverage" or "out-of-coverage" of one or more radio access networks (which may collectively be referred to as a "radio access network"). For sake of simplicity FIG. 1 depicts "coverage" as being with respect to an access node such as eNodeB which comprises a radio access network. It should be understood, however, that a wireless terminal may also be in coverage of the radio access network when served by any cell of the radio access network(s). For example, If wireless terminal UE1 and wireless terminal UE2 were served by different cells, when participating in sidelink direct discovery the wireless terminal UE1 and wireless terminal UE2 would still be in an in coverage sidelink discovery scenario.

In 3GPP Release 12 proximity service (ProSe) specifications, two types of sidelink (SL) services were defined: SL communications and SL direct discovery. Sidelink communications cover in coverage (IC) and out of coverage (OOC) scenarios with corresponding resource pool allocation methods. However, SL direct discovery has been defined in 3GPP Release 12 only for the in coverage discovery scenario.

There are two direct discovery types defined for in coverage scenario, Type 1 and Type 2B. In case of Type 1, a wireless terminal (e.g., UE) autonomously selects radio resources from the indicated Type 1 transmission resource pool for discovery signal transmission. In case of Type 2B, only an RRC_CONNECTED UE may request resources for transmission of D2D discovery messages from the eNB via RRC. Obviously, out of coverage UE performing discovery is not in RRC_CONNECTED mode, thus only Type 1 discovery is considered. In current Release 12, the eNB provides the UEs with the resource pool configuration, which may be signaled in broadcast SystemInformationBlockType (SIB) 19 or dedicated signalling. However, it is not easy and may be impossible for out-of-coverage UEs to obtain such kind of resource pool information.

Therefore, an object of the technology disclosed herein is provision of apparatus, methods, and techniques to provide resource pool allocation methods for out of coverage wireless terminals which are already in or are interested in direct discovery.

What is needed, therefore, and an example object of the technology disclosed herein, are methods, apparatus, and techniques for performing sidelink direct discovery in the partial coverage discovery scenario and the out-of-coverage discovery scenario.

SUMMARY

In one of its aspects the technology disclosed herein concerns a method performed by a wireless terminal. In a basic mode the method comprises receiving an indication that the wireless terminal is to be configured for sidelink direct discovery; making a determination that the wireless terminal is out of network coverage; in accordance with the determination, obtaining for a sidelink direct discovery operation a selected radio resource for from a pool of radio resources which is preconfigured in a memory of the wireless terminal.

In an example embodiment and mode the method further comprises using the selected radio resources for the sidelink direct discovery operation.

In an example embodiment and mode the method further comprises selecting the selected radio resources without regard to frequency information.

In an example embodiment and mode the method further comprises transmitting a sidelink direct discovery announcement on one fixed frequency.

In an example embodiment and mode the method further comprises selecting randomly the selected radio resources from the pool of radio resources which are preconfigured in the memory.

In an example embodiment and mode the method further comprises selecting according to a predetermined criteria the selected radio resources from the pool of radio resources which is preconfigured through the memory.

In an example embodiment and mode the pool of radio resources comprise pools of transmit radio resources and pools of receive radio resources, and wherein the pools of transmit radio resources and the pools of receive radio resources are co-extensive.

In an example embodiment and mode the method further comprises obtaining for the sidelink direct discovery operation from the memory both (1) preconfigured radio frequency information for use in the sidelink direct discovery operation; and (2) a mapping of radio resources, which are to be obtained as the selected radio resources resources, to the preconfigured radio frequency information.

In an example embodiment and mode, the pools of radio resources which are preconfigured through the memory comprise transmit radio resource pools and receive radio resource pools, and the transmit radio resource pools and the receive radio resource pools are co-extensive.

In an example embodiment and mode the pools of radio resources which are preconfigured through the memory comprise transmit radio resource pools and receive radio resource pools, and the transmit radio resource pools are a subset of the receive radio resource pools.

In an example embodiment and mode the method further comprises obtaining for the sidelink direct discovery operation a selected radio resource from a pool of radio resources which has been preconfigured through a memory of the wireless terminal.

In an example embodiment and mode the method further comprises obtaining for the sidelink direct discovery operation a selected radio resource from a pool of radio resources which has been preconfigured in a universal integrated circuit card (UICC).

In an example embodiment and mode the method further comprises obtaining for the sidelink direct discovery operation a selected radio resource from a pool of radio resources which has been preconfigured in a Subscriber Identity Module Mobile Equipment (ME).

In an example embodiment and mode the sidelink direct discovery operation comprises making a sidelink direct discovery announcement.

In an example embodiment and mode the sidelink direct discovery operation comprises monitoring a sidelink direct discovery announcement.

In another of its aspects the technology disclosed herein concerns a wireless terminal comprising a processor which is configured to receive an indication that the wireless terminal is to be configured for sidelink direct discovery; and when the wireless terminal is out of network coverage, to obtain for a sidelink direct discovery operation a selected radio resource from a pool of radio resources which is preconfigured in a memory.

In an example embodiment and mode the wireless terminal further comprises a transceiver which under direction of the processor is configured to use the selected radio resource for the sidelink direct discovery operation.

In an example embodiment and mode the memory comprises a universal integrated circuit card (UICC).

In an example embodiment and mode the memory comprises Subscriber Identity Module Mobile Equipment (ME).

In an example embodiment and mode the sidelink direct discovery operation comprises making a sidelink direct discovery announcement.

In an example embodiment and mode the sidelink direct discovery operation comprises monitoring a sidelink direct discovery announcement.

In another of its aspects the technology disclosed herein concerns a method performed by a wireless terminal. In a basic mode the method comprises obtaining a list of out-of-coverage radio resources from a Physical Sidelink Broadcast Channel (PSBCH) when the wireless terminal is in coverage of an access node of radio access network; and the wireless terminal using at least some of the out-of-coverage radio resources received from the PSBCH for sidelink direct discovery.

In an example embodiment and mode the method further comprises the wireless terminal using the at least some of the radio resources of the list received from the PSBCH for a sidelink direct discovery operation when the wireless terminal is out of coverage of the radio access network.

In an example embodiment and mode the method further comprises obtaining the list of out-of-coverage radio resources from a Physical Sidelink Broadcast Channel (PSBCH) associated with a sidelink direct communications sidelink synchronization signal (SLSS).

In an example embodiment and mode the method further comprises obtaining the list of out-of-coverage radio resources from a Physical Sidelink Broadcast Channel (PSBCH) associated with a sidelink direct discovery sidelink synchronization signal (SLSS).

In an example embodiment and mode the sidelink direct discovery operation comprises making a sidelink direct discovery announcement.

In an example embodiment and mode the sidelink direct discovery operation comprises monitoring a sidelink direct discovery announcement.

In another of its aspects the technology disclosed herein concerns a wireless terminal comprising a receiver and a processor. The receiver is configured to receive a Physical Sidelink Broadcast Channel (PSBCH). The processor is configured to obtain from the Physical Sidelink Broadcast Channel (PSBCH) a list of out-of-coverage radio resources; and to use at least some of the out-of-coverage radio resources received from the PSBCH for a sidelink direct discovery operation when the wireless terminal is out of coverage of the radio access network.

In an example embodiment and mode the receiver is configured to receive a Physical Sidelink Broadcast Channel (PSBCH) associated with a sidelink direct communications sidelink synchronization signal (SLSS), and the processor is configured to obtain the list of out-of-coverage radio resources from the Physical Sidelink Broadcast Channel (PSBCH) associated with the sidelink direct communications sidelink synchronization signal (SLSS).

In an example embodiment and mode the receiver is configured to receive a Physical Sidelink Broadcast Channel (PSBCH) associated with a sidelink direct discovery sidelink synchronization signal (SLSS), and the processor is configured to obtain the list of out-of-coverage radio resources from the Physical Sidelink Broadcast Channel (PSBCH) associated with the sidelink direct discovery sidelink synchronization signal (SLSS).

In an example embodiment and mode the sidelink direct discovery operation comprises a sidelink direct discovery announcement.

In an example embodiment and mode the sidelink direct discovery operation comprises monitoring a sidelink direct discovery announcement.

In another of its aspects the technology disclosed herein concerns a wireless terminal. The wireless terminal comprises a processor and a transmitter. The processor is configured to prepare a Physical Sidelink Broadcast Channel (PSBCH) to include a list of out-of-coverage radio resources which may be used by another wireless terminal for sidelink direct discovery when the another wireless terminal is out of coverage of a radio access network comprising the access node. The transmitter is configured to transmit the PSBCH over a radio interface to the another wireless terminal.

In an example embodiment and mode the processor is configured to prepare a Physical Sidelink Broadcast Channel (PSBCH) associated with a sidelink direct communications sidelink synchronization signal (SLSS) to include the list of out-of-coverage radio resources which may be used by a wireless terminal for sidelink direct discovery when the wireless terminal is out of coverage of the radio access network; and the transmitter is configured to transmit the Physical Sidelink Broadcast Channel (PSBCH) associated with the sidelink direct communications sidelink synchronization signal (SLSS) to the one or more wireless terminals.

In an example embodiment and mode the processor is configured to prepare a Physical Sidelink Broadcast Channel (PSBCH) associated with a sidelink direct discovery sidelink synchronization signal (SLSS) to include the list of out-of-coverage radio resources which may be used by a wireless terminal for sidelink direct discovery when the wireless terminal is out of coverage of the radio access network; and the transmitter is configured to transmit the Physical Sidelink Broadcast Channel (PSBCH) associated with the sidelink direct discovery sidelink synchronization signal (SLSS) to the one or more wireless terminals.

In another of its aspects the technology disclosed herein concerns a method in a wireless terminal. In a basic mode the method comprises preparing a Physical Sidelink Broadcast Channel (PSBCH) to include a list of out-of-coverage radio resources which may be used by another wireless terminal for sidelink direct discovery when the another wireless terminal is out of coverage of a radio access network comprising the access node; and, transmitting the PSBCH over a radio interface to the another wireless terminal.

In an example embodiment and mode the method further comprises preparing a Physical Sidelink Broadcast Channel (PSBCH) associated with a sidelink direct communications sidelink synchronization signal (SLSS) to include the list of out-of-coverage radio resources which may be used by a wireless terminal for the sidelink direct discovery when the wireless terminal is out of coverage of the radio access network; and transmitting the Physical Sidelink Broadcast Channel (PSBCH) associated with the sidelink direct communications sidelink synchronization signal (SLSS) to the another wireless terminal.

In an example embodiment and mode the method further comprises preparing a Physical Sidelink Broadcast Channel (PSBCH) associated with a sidelink direct communication sidelink synchronization signal (SLSS) to include the list of out-of-coverage radio resources which may be used by the another wireless terminal for the sidelink direct discovery when the another wireless terminal is out of coverage of the radio access network; and transmitting the Physical Sidelink Broadcast Channel (PSBCH) associated with the sidelink direct communication sidelink synchronization signal (SLSS) to the another wireless terminal.

In an example embodiment and mode the method further comprises preparing a Physical Sidelink Broadcast Channel (PSBCH) associated with a sidelink direct discovery sidelink synchronization signal (SLSS) to include the list of out-of-coverage radio resources which may be used by the another wireless terminal for the sidelink direct discovery when the another wireless terminal is out of coverage of the radio access network; and transmitting the Physical Sidelink Broadcast Channel (PSBCH) associated with the sidelink direct discovery sidelink synchronization signal (SLSS) to the another wireless terminal.

In another of its aspects the technology disclosed herein concerns a method in a wireless terminal. In a basic mode the method comprises obtaining, from a memory of the wireless terminal, pre-configured sidelink direct discovery fixed position information; generating, in accordance with the sidelink direct discovery fixed position information, a sidelink direct discovery announcement message which includes radio resource information for sidelink direct discovery; and, transmitting the sidelink direct discovery announcement message including the radio resource information over a radio interface.

In an example embodiment and mode the method further comprises generating the sidelink direct discovery announcement message using the sidelink direct discovery fixed position information in a manner such that another wireless terminal knowing the sidelink direct discovery fixed position information is able to detect the sidelink direct discovery announcement message using the sidelink direct discovery fixed position information.

In an example embodiment and mode the radio resource information comprises (1) radio resource pool information; (2) radio resource pool usage information; or (3) a combination of (1) and (2).

In an example embodiment and mode the radio resource pool information comprises a list of pools of radio resources, and the method further comprises using a radio resource from at least one of the pools of the list to generate the sidelink direct discovery announcement message.

In an example embodiment and mode the method further comprises obtaining the radio resource pool information from one or more of the following: (1) broadcasted system information; (2) a message transmitted by another wireless terminal which is not in coverage of the radio access network; or (3) from the memory of the wireless terminal and which is pre-configured to include the radio resource pool information.

In an example embodiment and mode the method further comprises including at least one of the pools of the list in the sidelink direct discovery announcement message.

In an example embodiment and mode the method further comprises transmitting a subsequent sidelink direct discovery announcement message to update the pools of the list when the wireless terminal occupies or releases a pool of radio resources.

In an example embodiment and mode sidelink direct discovery fixed position information comprises time and/or frequency.

In an example embodiment and mode the method further comprises obtaining the pre-configured sidelink direct discovery fixed position information from a UICC or a ME which is externally loaded into the wireless terminal.

In another of its aspects the technology disclosed herein concerns a wireless terminal comprising a memory, a processor, and a transmitter. The memory is pre-configured to include sidelink direct discovery fixed position information. The processor is configured to generate, in accordance with the sidelink direct discovery fixed position information, a sidelink direct discovery announcement message which includes radio resource information for sidelink direct discovery. The transmitter is configured to transmit the sidelink direct discovery announcement message including the radio resource information over a radio interface.

In an example embodiment and mode the processor is configured to generate the sidelink direct discovery announcement message using the sidelink direct discovery fixed position information in a manner such that another wireless terminal knowing the sidelink direct discovery fixed position information is able to detect the sidelink direct discovery announcement message using the sidelink direct discovery fixed position information.

In an example embodiment and mode the radio resource information comprises (1) radio resource pool information; (2) radio resource pool usage information; or (3) a combination of (1) and (2).

In an example embodiment and mode the radio resource pool information comprises a list of pools of radio resources, and wherein the processor is configured to use a radio resource from at least one of the pools of the list to generate the sidelink direct discovery announcement message.

In an example embodiment and mode the processor is configured to obtain the radio resource pool information from one or more of the following: (1) system information which is broadcast by an access node of a radio access network and received by the wireless terminal when the wireless terminal is in coverage of the radio access network; (2) a message transmitted by another wireless terminal which is not in coverage of the radio access network; or (3) from the memory which is pre-configured to include the radio resource pool information.

In an example embodiment and mode the processor is further configured to include at least one of the pools of the list in the sidelink direct discovery announcement message.

In an example embodiment and mode the processor is further configured to generate a subsequent sidelink direct discovery announcement message to update the pools of the list when the wireless terminal occupies or releases a pool of radio resources.

In an example embodiment and mode the sidelink direct discovery fixed position information comprises time and/or frequency.

In an example embodiment and mode the memory comprises a UICC or a ME which is externally loaded into the wireless terminal.

In another of its aspects the technology disclosed herein concerns a method in a wireless terminal. In a basic mode the method comprises obtaining from a memory of the wireless terminal pre-configured sidelink direct discovery fixed position information; and, using the pre-configured sidelink direct discovery fixed position information to detect a sidelink direct discovery announcement message over a radio interface from another wireless terminal.

In an example embodiment and mode the method further comprises decoding radio resource pool information from the sidelink direct discovery announcement message.

In an example embodiment and mode the radio resource pool information comprises an identification of pools of transmit radio resources and of pools of receive radio resources.

In another of its aspects the technology disclosed herein concerns a wireless terminal. The wireless terminal comprises a memory and a processor. The memory is pre-configured with sidelink direct discovery fixed position information. The processor is configured to use the pre-configured sidelink direct discovery fixed position information to detect a sidelink direct discovery announcement message which is received over a radio interface from another wireless terminal.

In an example embodiment and mode the processor is further configured to decode radio resource pool information from the sidelink direct discovery announcement message.

In an example embodiment and mode the radio resource pool information comprises an identification of pools of transmit radio resources and of pools of receive radio resources.

In another of its aspects the technology disclosed herein concerns a method in a wireless terminal. In a basic mode the method comprises, when the wireless terminal is out of coverage of a radio access network, obtaining from a memory of the wireless terminal information pre-configured to enable the wireless terminal to participate in sidelink direct discovery; and when the wireless terminal subsequently obtains radio resource pool information from another source, the wireless terminal not using the pre-configured information but instead using the radio resource pool information obtained from the another source for participating in a sidelink direct discovery operation.

In an example embodiment and mode the method further comprises obtaining the pre-configured information from a UICC or a ME which is externally loaded into the wireless terminal.

In an example embodiment and mode the pre-configured information comprises default radio resources for use in the sidelink direct discovery.

In an example embodiment and mode the pre-configured information comprises a fixed position at which the wireless terminal should monitor for a sidelink direct discovery announcement message from another wireless terminal.

In an example embodiment and mode the method further comprises, after obtaining the pre-configured information: the wireless terminal subsequently being discovered by another wireless terminal during sidelink direct discovery; the wireless terminal obtaining the radio resource pool information from the another wireless terminal as the other source; and the wireless terminal using the radio resource pool information obtained from the another wireless terminal for participating in the sidelink direct discovery operation.

In an example embodiment and mode the method further comprises, after obtaining the pre-configured information: the wireless terminal subsequently obtaining the radio resource pool information from another wireless terminal; and, the wireless terminal using the radio resource pool information obtained from the another wireless terminal for participating in the sidelink direct discovery operation.

In an example embodiment and mode the method further comprises obtaining the radio resource pool information from a PSBCH broadcast by the another wireless terminal.

In another of its aspects the technology disclosed herein concerns a wireless terminal comprising a memory and processor. The memory is configured to store information pre-configured to enable the wireless terminal to participate in sidelink direct discovery. The processor is configured to obtain the pre-configured information from the memory, but when the wireless terminal subsequently obtains radio resource pool information from another source, to cause the wireless terminal to not use the pre-configured information but instead to use the radio resource pool information obtained from the another source for participating in a sidelink direct discovery operation.

In an example embodiment and mode the memory comprises a UICC or a ME which is externally loaded into the wireless terminal.

In an example embodiment and mode the pre-configured information comprises default radio resources for use in the sidelink direct discovery.

In an example embodiment and mode the pre-configured information comprises a fixed position at which the wireless terminal should monitor for a sidelink direct discovery announcement message from another wireless terminal.

In an example embodiment and mode, wherein, after obtaining the pre-configured information and the wireless terminal is subsequently discovered by another wireless terminal during sidelink direct discovery, the processor is further configured to obtaining the radio resource pool information from the another wireless terminal as the other source and to use the radio resource pool information obtained from the another wireless terminal for participating in the sidelink direct discovery operation.

In an example embodiment and mode the processor is further configured, after obtaining the pre-configured information: to subsequently obtain the radio resource pool information from another wireless terminal; and, to use the radio resource pool information obtained from the another wireless terminal for participating in the sidelink direct discovery operation.

In an example embodiment and mode processor is further configured to obtain the radio resource pool information from a PSBCH broadcast by the another wireless terminal.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
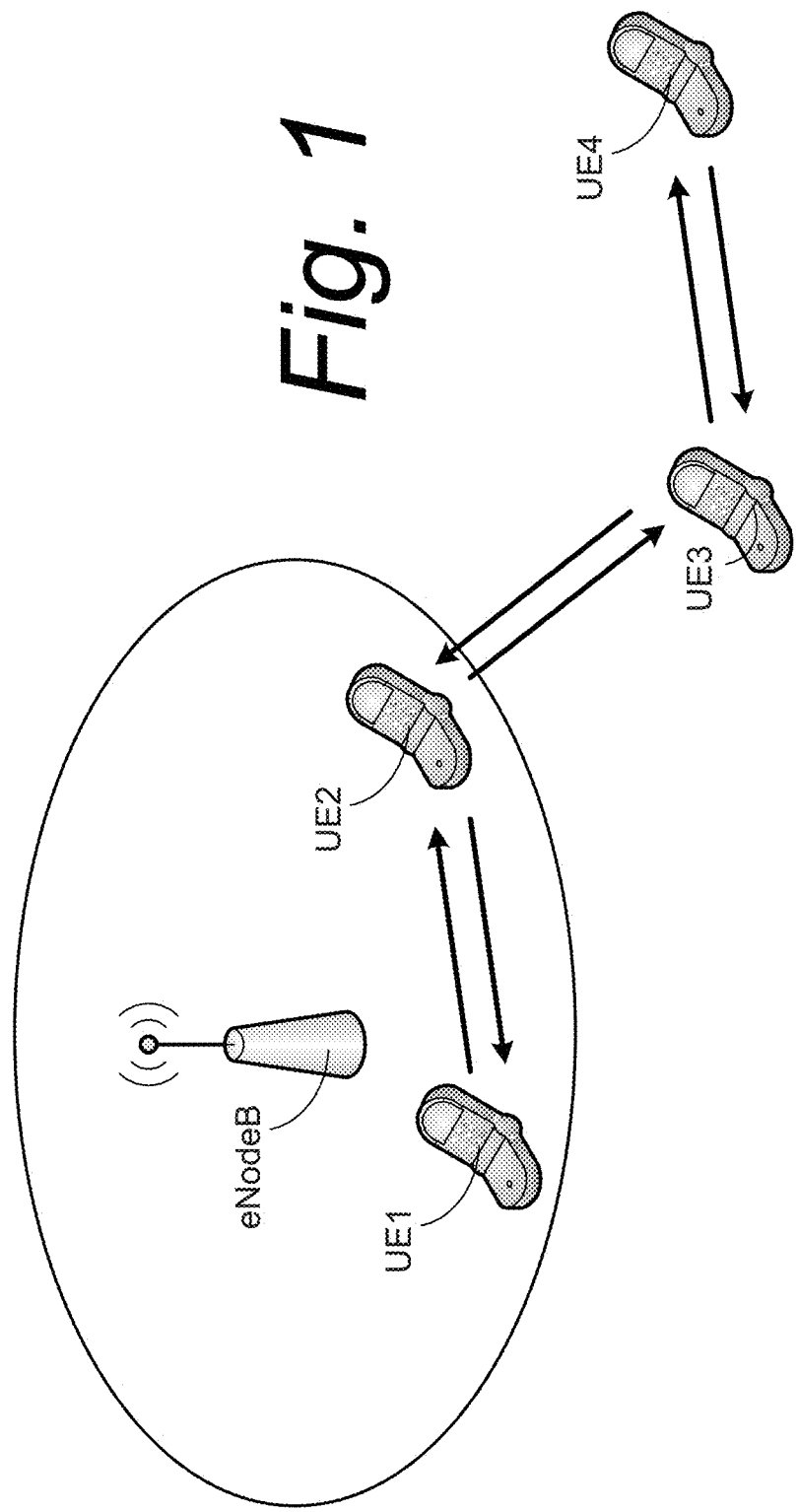
FIG. 1 is a diagrammatic view showing generally three scenarios which may occur in sidelink direct discovery, i.e., an in coverage sidelink direct discovery scenario; a partial coverage sidelink direct discovery scenario; and an out-of-coverage sidelink direct discovery scenario.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "device-to-device ("D2D") communication" can refer to a mode of communication between or among wireless terminals that operate on a cellular network or other telecommunications system in which the communication data traffic from one wireless terminal to another wireless terminal does not pass through a centralized base station or other device in the cellular network or other telecommunications system. As explained above, device-to-device (D2D) communication is also known by the more recent term "sidelink direct communication". Thus, as mentioned above, device-to-device (D2D) communications differs from "WAN" or "Cellular communication" which is or involves communication between the base station and the wireless terminal. Communication data is sent using communication signals and can include voice communications or data communications intended for consumption by a user of a wireless terminal. Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As used herein, a "D2D signal" or "D2D signals" includes channels, reference signals, and synchronization signals for D2D communication and/or discovery.

As used herein, a radio resource "pool" may comprise one radio resource pool or plural radio resource pools. Hence, "pool" is understood to include "pools" and thus also to mean or be denoted as "pool(s)".

Frequency" is one kind of "resource(s)". Normally in LTE "resources" mean resource blocks (RBs) in both time and frequency domains. While resource pools mean some RBs with specifically defined ranges (time and/or frequency) for some particular usage, e.g., transmission resource pool, which may include, e.g., resource pool 1 which is specially for mode 1 transmission in the cell, resource pool 2 which is specially for mode 2 transmission in the cell, resource pool 3 which is specially for mode 2 transmission in the intra-frequency adjacent cell. As used herein, "monitoring resource pools with indicated frequency from higher layer" or similar language means the resource pools are designed especially for one cell or some intra-frequency cells. If there is no "indicated frequency from higher layer", the wireless terminal may have to monitor all resource pools in its list, or may monitor some of resource pools in its list according to some priority rules due to implementation issue, such resource pools may or may not cover the "indicated frequency".

As mentioned above, sidelink direct discovery has been defined in 3GPP Release 12 only for the in coverage discovery scenario. As used herein, "ProSe Direct Discovery" is defined as the procedure used by a wireless terminal supporting ProSe Direct Discovery to discover other wireless terminal(s) in its proximity, e.g., using direct radio signals via a PC5 Interface. Heretofore ProSe Direct Discovery has been supported only when the wireless terminal is served by E-UTRAN in Release 12. In the future Release 13, the discovery should be extended to the out-of-coverage scenario, at least for public safety applications. Therefore, how in coverage wireless terminals capable of sidelink direct discovery can discover other wireless terminals or be discovered by out-of-coverage wireless terminals, and how the out-of-coverage wireless terminals capable of sidelink direct discovery can discover each other needs to be resolved, especially considering direct discovery is normally performed frequency by frequency.

The sidelink direct discovery for the in coverage discovery scenario may follow the following procedure:

The UE supporting ProSe Direct Communication can operate in two modes for resource allocation:
  Scheduled resource allocation is characterized by:
    The UE needs to be RRC_CONNECTED in order to transmit data;
    The UE requests transmission resources from the eNB. The eNB schedules transmission resources for transmission of Sidelink Control and data;
    The UE sends a scheduling request (D-SR or Random Access) to the eNB followed by a ProSe BSR. Based on the ProSe BSR the eNB can determine that the UE has data for a ProSe Direct Communication transmission and estimate the resources needed for transmission. eNB can schedule transmission resources for ProSe Direct Communication using configured SL-RNTI.
  UE autonomous resource selection is characterized by:
    A UE on its own selects resources from resource pools and performs transport format selection to transmit Sidelink Control and data.

A UE in RRC_CONNECTED may send a ProSe UE Information indication to eNB when UE becomes interested in ProSe Direct Communication. In response eNB may configure the UE with a SL-RNTI.

A UE is considered in-coverage for ProSe Direct Communication whenever it detects a cell on a Public Safety ProSe Carrier. The following rules apply for the UE:
  If the UE is out of coverage for ProSe Direct Communication it can only use UE autonomous resource selection;
  If the UE is in coverage for ProSe Direct Communication it may use scheduled resource allocation or UE autonomous resource selection as per eNB configuration;
  If the UE is in coverage for ProSe Direct Communication it may use only the resource allocation mode indicated by eNB configuration unless one of the exceptional cases as specified in [16] occurs;
    When an exceptional case occurs the UE is allowed to use UE autonomous resource selection temporarily even though it was configured to use scheduled resource allocation. Resource pool to be used during exceptional case may be provided by eNB.

A UE that is camped or connected on one carrier frequency but interested in ProSe Direct Communication operation on another carrier frequency (i.e. Public Safety ProSe Carrier) may attempt to find cells on the Public Safety ProSe Carrier.

An RRC_IDLE UE camped on a cell in another carrier frequency, but in the coverage area of an E-UTRA cell on Public Safety ProSe Carrier may consider the Public Safety ProSe carrier to be the highest priority; and reselects to the cell on the Public Safety ProSe Carrier. UE may consider a frequency (non-Public Safety ProSe carrier) to be the highest priority if it can perform ProSe Direct Communication only while camping on the frequency;

An RRC_CONNECTED UE served by a cell in another carrier frequency may send a ProSe UE Information indication to its serving cell when it wants to perform ProSe Direct Communication. The indication contains the intended Public Safety ProSe Carrier;
  The serving cell indicates with the presence of SIB 18 whether the UE is allowed to send a ProSe UE Information indication;
  The serving cell may configure an inter-frequency RRM measurement on the Public Safety ProSe Carrier;
  Once the UE enters coverage of a cell on the Public Safety ProSe Carrier, based on measurement report the eNB performs inter-frequency mobility to the Public Safety ProSe Carrier;
  If inter-frequency mobility is not performed by the serving cell, or if it fails, the UE may still perform ProSe Direct Communication using UE autonomous resource selection from the resource pools, if any, broadcasted by the detected E-UTRA cell on the Public Safety ProSe Carrier.

If the UE does not detect an E-UTRA cell on the Public Safety ProSe Carrier, the UE can use Public Safety ProSe Carrier resources preconfigured in the UICC or ME for out of coverage ProSe Direct Communication;

If the UE detects an E-UTRA cell on the Public Safety ProSe Carrier, the UE stops using resources preconfigured in the UICC or ME. UE may use UE autonomous resource selection from the resource pools, if any, broadcasted by the detected E-UTRA cell on the Public Safety ProSe Carrier.

NOTE: For Rel-12 all ProSe communication (for a UE) is performed on a single preconfigured Public Safety ProSe Carrier, which is valid in the operating region. Higher layers check validity of the Public Safety ProSe Carrier in the operating region.

The cell on the Public Safety ProSe Carrier may select one of the following options:
  The cell on the Public Safety ProSe Carrier may provide a transmission resource pool for UE autonomous resource selection in SIB 18;
    UEs that are authorized for ProSe Direct Communication may use these resources for ProSe Direct Communication in RRC_IDLE in the cell on the same carrier (i.e. Public Safety ProSe Carrier).

UEs that are authorized for ProSe Direct Communication may use these resources for ProSe Direct Communication in RRC_IDLE or RRC_CONNECTED in a cell on another carrier.

The cell on the Public Safety ProSe Carrier may indicate in SIB 18 that it supports ProSe Direct Communication but does not provide transmission resources. UEs need to enter RRC_CONNECTED to perform ProSe Direct Communication transmission. In this case the cell on the Public Safety ProSe Carrier may provide in broadcast signalling an exceptional transmission resource pool for UE autonomous resource selection, to be used by the UE in exceptional cases, as specified in [16].

A UE in RRC_CONNECTED that is authorized to perform ProSe Direct Communication transmission indicates to the serving eNB that it wants to perform ProSe Direct Communication transmissions;

The eNB validates whether the UE is authorized for ProSe Direct Communication transmission using the UE context received from MME;

The eNB may configure a UE by dedicated signalling with a transmission resource pool for UE autonomous resource selection; that may be used without constraints while the UE is in RRC_CONNECTED. Alternatively, the eNB may configure a UE to use the exceptional transmission resource pool for UE autonomous resource selection which the UE is allowed to use only in exceptional cases and rely on scheduled resource allocation otherwise.

23.10.3.1 Resource Pool for Sidelink Control

The resource pools for Sidelink Control when the UE is out of coverage for ProSe Direct Communication are configured as below:

The resource pool used for reception is pre-configured;
The resource pool used for transmission is pre-configured.

The resource pools for Sidelink Control when the UE is in coverage for ProSe Direct Communication are configured as below:

The resource pool used for reception is configured by the eNB via RRC, in broadcast signalling;

The resource pool used for transmission is configured by the eNB via RRC, in dedicated or broadcast signalling, if UE autonomous resource selection is used;

The resource pool used for transmission is configured by the eNB via RRC, in dedicated signalling if scheduled resource allocation is used;

The eNB schedules the specific resource(s) for Sidelink Control transmission within the configured reception pool.

NOTE: In order to perform communication even when some UEs are in-coverage and some UEs are out of coverage, all UEs (i.e. both in and out of coverage) may be configured with reception resource pools for Sidelink Control which are the union of the resource pools used for transmission of Sidelink Control in the serving cell and neighbour cells and transmission of Sidelink Control for out of coverage.

23.10.3.2 Resource Pool for Data

The resource pools for data when the UE is out of coverage for ProSe Direct Communication are configured as below:

The resource pool used for reception is pre-configured;
The resource pool used for transmission is pre-configured.

The resource pools for data when the UE is in coverage for ProSe Direct Communication are configured as below:

The resource pools used for transmission and reception are configured by the eNB via RRC, in dedicated or broadcast signalling, if UE autonomous resource selection is used;

There is no resource pool for transmission if scheduled resource allocation is used.

23.11 Support for ProSe Direct Discovery 23.11.1 General

ProSe Direct Discovery is defined as the procedure used by the UE supporting ProSe Direct Discovery to discover other UE(s) in its proximity, using E-UTRA direct radio signals via PC5. ProSe Direct Discovery is supported only when the UE is served by E-UTRAN.

Upper layer handles authorization for announcement and monitoring of discovery message.

Content of discovery message is transparent to Access Stratum (AS) and no distinction in AS is made for ProSe Direct Discovery models and types of ProSe Direct Discovery [62].

NOTE: The ProSe Protocol ensures that only valid discovery messages are delivered to AS for announcement.

The UE can participate in announcing and monitoring of discovery message in both RRC_IDLE and RRC_CONNECTED states as per eNB configuration. The UE announces and monitors its discovery message subject to the half-duplex constraint. The UE that participates in announcing and monitoring of discovery messages maintains the current UTC time. The UE that participates in announcing transmits the discovery message which is generated by the ProSe Protocol taking into account the UTC time upon transmission of the discovery message. In the monitoring UE the ProSe Protocol provides the message to be verified together with the UTC time upon reception of the message to the ProSe Function.

NOTE: UE may obtain UTC time from the RAN via SIB 16 or from other sources such as NITZ, NTP, and GNSS depending on their availability.

In order to perform synchronisation UE(s) participating in announcing of discovery messages may act as a synchronisation source by transmitting a synchronisation signal based on the resource information for synchronisation signals provided in SIB 19. There are three range classes. Upper layer authorisation provides applicable range class of the UE. Maximum allowed transmission power for each range class is signalled in SIB 19. UE uses the applicable maximum allowed transmission power corresponding to its authorised range class. This puts an upper limit on the determined transmit power based on open loop power control parameters.

23.11.2 Radio Protocol Architecture

The Access Stratum protocol stack for ProSe Direct Discovery consists of only MAC and PHY.

The AS layer performs the following functions:

Interfaces with upper layer (ProSe Protocol): The MAC layer receives the discovery message from the upper layer (ProSe Protocol). The IP layer is not used for transmitting the discovery message;

Scheduling: The MAC layer determines the radio resource to be used for announcing the discovery message received from upper layer;

Discovery PDU generation: The MAC layer builds the MAC PDU carrying the discovery message and sends the MAC PDU to the physical layer for transmission in the determined radio resource. No MAC header is added.

23.11.3 Radio Resource Allocation

There are two types of resource allocation for discovery message announcement.

UE autonomous resource selection: A resource allocation procedure where resources for announcing of discovery message are allocated on a non UE specific basis, further characterized by:
  The eNB provides the UE(s) with the resource pool configuration used for announcing of discovery message. The configuration may be signalled in broadcast or dedicated signalling;
  The UE autonomously selects radio resource(s) from the indicated resource pool and announces discovery message;
  The UE can announce discovery message on a randomly selected discovery resource during each discovery period.
Scheduled resource allocation: A resource allocation procedure where resources for announcing of discovery message are allocated on per UE specific basis, further characterized by:
  The UE in RRC_CONNECTED may request resource(s) for announcing of discovery message from the eNB via RRC;
  The eNB assigns resource(s) via RRC;
  The resources are allocated within the resource pool that is configured in UEs for announcement.
For UEs in RRC_IDLE:
  The eNB may select one of the following options:
    The eNB may provide a resource pool for UE autonomous resource selection based discovery message announcement in SIB 19. UEs that are authorized for Prose Direct Discovery use these resources for announcing discovery message in RRC_IDLE;
    The eNB may indicate in SIB 19 that it supports ProSe Direct Discovery but does not provide resources for discovery message announcement. UEs need to enter RRC_CONNECTED in order to request resources for discovery message announcement.
For UEs in RRC_CONNECTED:
  A UE authorized to perform ProSe Direct Discovery announcement indicates to the eNB that it wants to perform ProSe Direct Discovery announcement;
  The eNB validates whether the UE is authorized for ProSe Direct Discovery announcement using the UE context received from MME;
  The eNB may configure the UE with resource pool for UE autonomous resource selection for discovery message announcement via dedicated signalling;
  The eNB may configure resource pool along with dedicated resource in the form of time and frequency indices for discovery message announcement via dedicated RRC signalling;
  The resources allocated by the eNB via dedicated signalling are valid until;
    The eNB re-configures the resource(s) by RRC signalling or;
    The UE enters RRC_IDLE.
Authorised receiving UEs in RRC_IDLE and RRC_CONNECTED monitor resource pools used for UE autonomous resource selection and resource pools for scheduled resource allocation. The eNB provides the resource pool configuration used for discovery message monitoring in SIB 19. The SIB 19 may contain detailed ProSe Direct Discovery configuration used for announcing in neighbour cells of intra-frequency as well.
Synchronous and asynchronous deployments are supported. Discovery resources can be overlapping or non-overlapping across cells.
A UE if authorised by the NW can announce discovery message only on serving cell. The UE can monitor discovery resources in the same as well as other frequencies than the serving cell, in same or different PLMNs.
The serving cell may provide in SIB 19 a list of frequencies along with PLMN ID on which the UE may aim to monitor discovery message;
The serving cell does not provide detailed ProSe Discovery configuration for other carrier frequencies. The UE may read SIB 19 and other relevant SIBs on other carriers if it wants to perform discovery message monitoring on those carriers;
  Obtaining ProSe Direct Discovery configuration by reading SIB 19 (and other SIBs) of an inter-frequency and/or inter-PLMN cell may not affect the UE's Uu reception on the serving cell(s);
The UE performs intra-frequency ProSe Direct Discovery announcement in subframes in which a ProSe Direct Discovery resource pool is configured and the UE is not expected to perform uplink Uu transmission;
  The UE may not create autonomous gaps.
Intra-frequency, inter-frequency and inter-PLMN ProSe Direct Discovery monitoring may not affect Uu reception.
  The UE uses DRX occasions in RRC_IDLE and RRC_CONNECTED or second RX chain if it is available, for intra-frequency, inter-frequency and inter-PLMN discovery message monitoring;
  The UE may not create autonomous gaps.
An RRC_CONNECTED UE sends a ProSe UE Information indication to the serving cell if it is interested or no longer interested in intra-frequency, inter-frequency or inter-PLMN discovery message monitoring.
The sidelink direct discovery for the in coverage discovery scenario may also follows the following procedure.
  14 UE Procedures Related to Sidelink
A UE can be configured by higher layers with one or more PSDCH resource configuration(s). A PSDCH resource configuration can be for reception of PSDCH, or for transmission of PSDCH. The transmissions of PSDCH according to a PSDCH resource configuration are associated with either sidelink discovery type 1 or sidelink discovery type 2B. The physical sidelink discovery channel related procedures are described in subclause 14.3.
14.3 Physical Sidelink Discovery Channel Related Procedures
14.3.1 UE Procedure for Transmitting the PSDCH
If a UE is configured by higher layers to transmit PSDCH according to a PSDCH resource configuration, in a PSDCH period i,
  the number of transmissions for a transport block on PSDCH is $N_{SLD}^{TX}=n+1$ where n is given by the higher layer parameter discoveryNumRetx, and each transmission corresponds to one subframe belonging to a set of subframes, and in each subframe, the PSDCH is transmitted on two physical resource blocks per slot.
  for sidelink discovery type 1,
    the allowed values for PSDCH resource selection are given by 0, 1 ... ($N_f \cdot N_t$−1), where $N_t = \lfloor L_{PSDCH} / N_{SLD}^{TX} \rfloor$ and $N_f = \lfloor M_{RB}^{PSDCH\_RP}/2 \rfloor$, and
    the j-th transmission ($1 \le j \le N_{SLD}^{TX}$) for the transport block occurs in contiguous resource blocks $$m_{2 \cdot a_j^{(i)}}^{PSDCH}$$

and $$m^{PSDCH}_{2 \cdot a_j^{(i)}+1}$$

of subframe $$l^{PSDCH}_{N^{TX}_{SLD} \cdot b_1^{(i)}+j-1}$$

of the PSDCH period, where
$a_j^{(i)} = ((j-1) \cdot \lfloor N_f/N_{SLD}^{TX} \rfloor + \lfloor n_{PSDCH}/N_t \rfloor) \bmod N_f$ and
$b_1^{(i)} = n_{PSDCH} \bmod N_t$ and using selected resource value $n_{PSDCH}$ (described in [8]).
$(l_0^{PSDCH}, l_1^{PSDCH}, \ldots, l_{L_{PSDCH}-1}^{PSDCH})$,
$(m_0^{PSDCH}, m_1^{PSDCH}, \ldots, m_{M_{RB}^{PSDCH\_RP}-1}^{PSDCH})$,
$L_{PSDCH}$ and $M_{RB}^{PSDCH\_RP}$ are described in subclause 14.3.3.

for sidelink discovery type 2B,
The j-th transmission ($1 \leq j \leq N_{SLD}^{TX}$) for the transport block occurs in contiguous resource blocks $$m^{PSDCH}_{2 \cdot a_j^{(i)}} \text{ and } m^{PSDCH}_{2 \cdot a_j^{(i)}+1}$$

of subframe $$l^{PSDCH}_{N^{TX}_{SLD} \cdot b_1^{(i)}+j-1}$$

of the PSDCH period, where $a_1^{(i)} = ((N_{PSDCH}^{(2)} + n') \bmod 10 + \lfloor (a_1^{(i-1)} + N_f b_1^{(i-1)})/N_t \rfloor) \bmod N_f$ $b_1^{(i)} = (N_{PSDCH}^{(1)} + N_{PSDCH}^{(3)} \cdot a_1^{(i-1)} + N_f b_1^{(i-1)}) \bmod N_t$ $a_j^{(i)} = ((j-1) \cdot \lfloor N_f/N_{SLD}^{TX} \rfloor + a_1^{(i)}) \bmod N_f$ for $1 < j \leq N_{SLD}^{TX}$ $N_t = \lfloor L_{PSDCH}/N_{SLD}^{TX} \rfloor$ and $N_f = \lfloor M_{RB}^{PSDCH\_RP}/2 \rfloor$, and $(l_0^{PSDCH}, l_1^{PSDCH}, \ldots, l_{L_{PSDCH}-1}^{PSDCH})$,
$(m_0^{PSDCH}, m_1^{PSDCH}, \ldots, m_{M_{RB}^{PSDCH\_RP}-1}^{PSDCH})$,
$L_{PSDCH}$ and $M_{RB}^{PSDCH\_RP}$ are described in subclause 14.3.3.

$a_1^{(0)}$ and $b_1^{(0)}$ are given by higher layer parameters nfType2BDiscovery and ntType2BDiscovery, respectively and that associated with the PSDCH resource configuration.

$N_{PSDCH}^{(1)}$, $N_{PSDCH}^{(2)}$ and $N_{PSDCH}^{(3)}$ are given by higher layer parameters aType2BDiscovery, bDashType2BDiscovery, and cType2BDiscovery, respectively and that are associated with the PSDCH resource configuration.

n' is the number of PSDCH periods since $N_{PSDCH}^{(2)}$ was received.

the transport block size is 232

For sidelink discovery, the UE transmit power $P_{PSDCH}$ is given by the following $P_{PSDCH} = \min\{P_{CMAX,PSDCH}, 10\log_{10}(M_{PSDCH}) + P_{O\_PSDCH,1} + \alpha_{PSDCH,1} \cdot PL\}$ [dBm]

where $P_{CMAX,PSDCH}$ is defined in [6], and $M_{PSDCH}=2$ and $PL=PL_c$ where $PL_c$ is defined in subclause 5.1.1.1. $P_{O\_PSDCH,1}$ and $\alpha_{PSDCH,1}$ are provided by higher layer parameters discoveryPo and discoveryAlpha, respectively and are associated with the corresponding PSDCH resource configuration.

A UE may drop any PSDCH transmissions that are associated with sidelink discovery type 1 in a sidelink subframe if the UE has a PSDCH transmission associated with sidelink discovery type 2B in that subframe.

14.3.2 UE Procedure for Receiving the PSDCH

For sidelink discovery type 1, for each PSDCH resource configuration associated with reception of PSDCH, a UE configured by higher layers to detect a transport block on PSDCH can decode the PSDCH according to the PSDCH resource configuration.

For sidelink discovery type 2B, for each PSDCH resource configuration associated with reception of PSDCH, a UE configured by higher layers to detect a transport block on PSDCH can decode the PSDCH according to the PSDCH resource configuration.

14.3.3 UE Procedure for Determining Resource Block Pool and Subframe Pool for Sidelink Discovery A PSDCH resource configuration for transmission/reception is associated with a set of periodically occurring time-domain periods (known as PSDCH periods). The i-th PSDCH period begins at subframe with subframe index $j_{begin} = O_3 + i \cdot P$ and ends in subframe with subframe index $j_{end} = O_3 + (i+1) \cdot P - 1$, where $0 \leq j_{begin} < 10240$, the subframe index is relative to subframe#0 of a radio frame corresponding to SFN 0 of the serving cell or DFN 0 (described in [11]), $O_3$ is the discoveryOffsetIndicator indicated by the PSDCH resource configuration P is the discoveryPeriod indicated by the PSDCH resource configuration.

For a PSDCH period, the UE determines a discovery pool consisting of a subframe pool and a resource block pool for PSDCH as follows.

For TDD, if the parameter tddConfig is indicated by the PSDCH resource configuration, the TDD UL/DL configuration used for determining the subframe pool is given by the parameter tddConfig, otherwise, the TDD UL/DL configuration used for determining the subframe pool is given by the UL/DL configuration (i.e. parameter subframeAssignment) for the serving cell.

A bitmap $b_0, b_1, b_2, \ldots, b_{N'-1}$ is obtained using $b_j = a_{j \bmod N_B}$, for $0 \leq j < N'$, where $a_0, a_1, a_2, \ldots, a_{N_B-1}$ and $N_B$ are the bitmap and the length of the bitmap indicated by discoverySubframeBitmap, respectively, and $N' = N_B \cdot N_R$, where $N_R$ is the discoveryNumRepetition indicated by the PSDCH resource configuration.

The first N' uplink subframes are denoted by $(l_0, l_1, \ldots, l_{N'-1})$ arranged in increasing order of subframe index. A subframe $l_j$ ($0 \leq j < N'$) belongs to the subframe pool if $b_j = 1$. The subframes in the subframe pool are denoted by $(l_0^{PSDCH}, l_1^{PSDCH}, \ldots, l_{L_{PSDCH}-1}^{PSDCH})$ arranged in increasing order of subframe index and $L_{PSDCH}$ denotes the number of subframes in the subframe pool.

A PRB with index q ($0 \leq q < N_{RB}^{SL}$) belongs to the resource block pool if $S1 \leq q < S1+M$ or if $S2-M < q \leq S2$, where S1, S2, and M denote the discoveryStartPRB, discoveryEndPRB and discoveryNumPRB indicated by the PSDCH resource configuration respectively.

The resource blocks in the resource block pool are denoted by $$\left(m_0^{PSDCH}, m_1^{PSDCH}, \ldots, m_{M_{RB}^{PSDCH\_RP}-1}^{PSDCH}\right)$$

arranged in increasing order of resource block indices and $M_{RB}^{PSDCH\_RP}$ is the number of resource blocks in the resource block pool.

The sidelink direct discovery for the in coverage discovery scenario may also follows the following procedure.

5.2.2.x2 Actions upon Reception of SystemInformationBlockType19

Upon receiving SystemInformationBlockType19, the UE may:
1> if SystemInformationBlockType19 message includes the discConfig:
  2> from the next discovery period, as defined by discPeriod, use the resources indicated by discRxPool for sidelink direct discovery monitoring, as specified in 5.X.5;
  2> if SystemInformationBlockType19 message includes the discTxPoolCommon; and the UE is in RRC_IDLE:
    3> from the next discovery period, as defined by discPeriod, use the resources indicated by discTxPoolCommon for sidelink direct discovery announcement, as specified in 5.X.6;
  2> if the SystemInformationBlockType19 message includes the discTxPowerInfo:
    3> use the power information included in discTxPowerInfo for sidelink direct discovery transmission, as specified in TS 36.213 [23];

5.3.3.1a Conditions for Establishing RRC Connection for Sidelink Direct Communication/Discovery Upper layers initiate an RRC connection for sidelink direct communication only in the following case:
1> if configured by upper layers to transmit sidelink direct communication and related data is available for transmission:
  2> if SystemInformationBlockType18 is broadcast by the cell on which the UE camps; and if the valid version of SystemInformationBlockType18 does not include commTxPoolNormalCommon;

Upper layers initiate an RRC connection for sidelink direct discovery only in the following case:
1> if configured by upper layers to transmit sidelink direct discovery announcements:
  2> if SystemInformationBlockType19 is broadcast by the cell on which the UE camps: and if the valid version of SystemInformationBlockType19 does not include discTxPoolCommon;

NOTE: The interaction with NAS is left to UE implementation.

5.3.10.x Sidelink Dedicated Configuration

The UE may:
1> if the RRCConnectionReconfiguration message includes the sl-CommConfig:
  2> if commTxResources is included and set to setup:
    3> from the next SC period use the resources indicated by commTxResources for sidelink direct communication transmission, as specified in 5.X.4;
  2> else if commTxResources is included and set to release:
    3> from the next SC period, release the resources allocated for sidelink direct communication transmission previously configured by commTxResources;
1> if the RRCConnectionReconfiguration message includes the sl-DiscConfig:
  2> if discTxResources is included and set to setup:
    3> from the next discovery period, as defined by discPeriod, use the resources indicated by discTxResources for sidelink direct discovery announcement, as specified in 5.X.6;
  2> else if discTxResources is included and set to release:
    3> from the next discovery period, as defined by discPeriod, release the resources allocated for sidelink direct discovery announcement previously configured by discTxResources;

5.x Sidelink

5.X.1 Introduction

The sidelink direct communication/discovery/synchronisation resource configuration applies for the frequency at which it was received/acquired. Moreover, for a UE configured with one or more SCells, the sidelink direct communication/discovery/synchronisation resource configuration provided by dedicated signalling applies for the PCell/the primary frequency. Furthermore, the UE may not use the sidelink direct communication/discovery/synchronisation transmission resources received in one cell with the timing of another cell.

NOTE 1: Upper layers configure the UE to receive or transmit sidelink direct communication on a specific frequency, to monitor sidelink direct discovery announcements on one or more frequencies or to transmit sidelink direct discovery announcements on a specific frequency, but only if the UE is authorised to perform these particular ProSe related sidelink activities.

NOTE 2: It is up to UE implementation which actions to take (e.g. termination of unicast services, detach) when it is unable to perform the desired sidelink activities, e.g. due to UE capability limitations.

5.X.1a Conditions for Sidelink Operation

The UE may perform sidelink operation only if the following conditions are met:
1> if the UE's serving cell is suitable (RRC_IDLE or RRC_CONNECTED); or
1> if the UE's serving cell fulfills the conditions to support sidelink direct communication in limited service state as specified in TS 23.303 [N, 4.5.6] and the UE is in RRC_IDLE:
1> if the UE has no serving cell (RRC_IDLE);

5.X.2 Sidelink UE Information

5.X.2.1 General

The purpose of this procedure is to inform E-UTRAN that the UE is interested or no longer interested to receive sidelink direct communication or discovery, as well as to request assignment or release of transmission resources for sidelink direct communication or discovery announcements.

5.X.2.2 Initiation

A UE capable of sidelink direct communication or discovery that is in RRC_CONNECTED may initiate the procedure to indicate it is (interested in) receiving sidelink direct communication or discovery in several cases including upon successful connection establishment, upon change of interest, upon change to a PCell broadcasting SystemInformationBlockType18 or SystemInformationBlock- Type19. A UE capable of sidelink direct communication or discovery may initiate the procedure to request assignment of dedicated resources for the concerned sidelink direct communication transmission or discovery announcements.

NOTE 1: A UE in RRC_IDLE that is configured to transmit sidelink direct communication/discovery announcements, while SystemInformationBlockType18/SystemInformationBlockType19 does not include the resources for transmission (in normal conditions), initiates connection establishment in accordance with 5.3.3.1a.

Upon initiating the procedure, the UE may:
1>if SystemInformationBlockType18 is broadcast by the PCell:
  2>ensure having a valid version of SystemInformationBlockType18 for the PCell;
  2>if configured by upper layers to receive sidelink direct communication:
    3>if the UE did not transmit a SidelinkUEInformation message since last entering RRC_CONNECTED state; or
    3>if since the last time the UE transmitted a SidelinkUEInformation message the UE connected to a PCell not broadcasting SystemInformationBlockType18; or NOTE 2: After handover/re-establishment from a source PCell not broadcasting SystemInformationBlockType18 the UE repeats the same interest information that it provided previously as such a source PCell may not forward the interest information.

3>if the last transmission of the SidelinkUEInformation message did not include commRxInterestedFreq; or if the frequency configured by upper layers to receive sidelink direct communication on has changed since the last transmission of the SidelinkUEInformation message:
      4>initiate transmission of the SidelinkUEInformation message to indicate the sidelink direct communication reception frequency of interest in accordance with 5.x.2.3;
  2>else:
    3>if the last transmission of the SidelinkUEInformation message included commRxInterestedFreq:
      4>initiate transmission of the SidelinkUEInformation message to indicate it is no longer interested in sidelink direct communication reception in accordance with 5.x.2.3;
  2>if configured by upper layers to transmit sidelink direct communication:
    3>if the UE did not transmit a SidelinkUEInformation message since entering RRC_CONNECTED state; or
    3>if since the last time the UE transmitted a SidelinkUEInformation message the UE connected to a PCell not broadcasting SystemInformationBlockType18; or
    3>if the last transmission of the SidelinkUEInformation message did not include commTxResourceReq; or if the information carried by the commTxResourceReq has changed since the last transmission of the SidelinkUEInformation message:
      4>initiate transmission of the SidelinkUEInformation message to indicate the sidelink direct communication transmission resources required by the UE in accordance with 5.x.2.3;
  2>else:
    3>if the last transmission of the SidelinkUEInformation message included commTxResourceReq:
      4>initiate transmission of the SidelinkUEInformation message to indicate it does no longer require sidelink direct communication transmission resources in accordance with 5.x.2.3;
1>if SystemInformationBlockType19 is broadcast by the PCell:
  2>ensure having a valid version of SystemInformationBlockType19 for the PCell;
  2>if configured by upper layers to receive sidelink direct discovery announcements on a serving frequency or on one or more frequencies included in discInterFreqList, if included in SystemInformationBlockType19:
    3>if the UE did not transmit a SidelinkUEInformation message since last entering RRC_CONNECTED state; or
    3>if since the last time the UE transmitted a SidelinkUEInformation message the UE connected to a PCell not broadcasting SystemInformationBlockType19; or
    3>if the last transmission of the SidelinkUEInformation message did not include discRxInterest:
      4>initiate transmission of the SidelinkUEInformation message to indicate it is interested in sidelink direct discovery reception in accordance with 5.x.2.3;
  2>else:
    3>if the last transmission of the SidelinkUEInformation message included discRxInterest:
      4>initiate transmission of the SidelinkUEInformation message to indicate it is no longer interested in sidelink direct discovery reception in accordance with 5.x.2.3;
  2>if the UE is configured by upper layers to transmit sidelink direct discovery announcements:
    3>if the UE did not transmit a SidelinkUEInformation message since entering RRC_CONNECTED state; or
    3>if since the last time the UE transmitted a SidelinkUEInformation message the UE connected to a PCell not broadcasting SystemInformationBlockType19; or
    3>if the last transmission of the SidelinkUEInformation message did not include discTxResourceReq; or if the direct discovery announcement resources required by the UE have changed (i.e. resulting in a change of discTxResourceReq) since the last transmission of the SidelinkUEInformation message:
      4>initiate transmission of the SidelinkUEInformation message to indicate the sidelink direct discovery announcement resources required by the UE in accordance with 5.x.2.3;
  2>else:
    3>if the last transmission of the SidelinkUEInformation message included discTxResourceReq:
      4>initiate transmission of the SidelinkUEInformation message to indicate it does no longer require sidelink direct discovery announcement resources in accordance with 5.x.2.3;

5.X.2.3 Actions Related to Transmission of SidelinkUEInformation Message

The UE may set the contents of the SidelinkUEInformation message as follows:
1> if SystemInformationBlockType18 is broadcast by the PCell:
  2> if configured by upper layers to receive sidelink direct communication:
    3> include commRxInterestedFreq and set it to the sidelink direct communication frequency;
  2> if configured by upper layers to transmit sidelink direct communication:
    3> include commTxResourceReq and set its fields as follows:
      4> set carrierFreq to indicate the sidelink direct communication frequency i.e. the same value as indicated in commRxInterestedFreq if included;
      4> set destinationInfoList to include the sidelink direct communication transmission destination(s) for which it requests E-UTRAN to assign dedicated resources;
1> if SystemInformationBlockType19 is broadcast by the PCell:
  2> if configured by upper layers to receive sidelink direct discovery announcements on a serving frequency or one or more frequencies included in discInterFreqList, if included in SystemInformationBlockType19:
    3> include discRxInterest;
  2> if the UE is configured by upper layers to transmit sidelink direct discovery announcements:
    3> include discTxResourceReq and set it to indicate the number of resources for sidelink direct discovery announcement for which it requests E-UTRAN to assign dedicated resources;

The UE may submit the SidelinkUEInformation message to lower layers for transmission.

5.X.5 Direct Discovery Monitoring

A UE capable of sidelink direct discovery that is configured by upper layers to monitor sidelink direct discovery announcements may:
1> for each frequency the UE is configured to monitor sidelink direct discovery announcements on, prioritising the frequencies included in discInterFreqList, if included in SystemInformationBlockType19:
  2> configure lower layers to monitor sidelink direct discovery announcements using the pool of resources indicated by discRxPool in SystemInformationBlockType19 without affecting normal operation i.e. receive during idle periods or by using a spare receiver;

NOTE 1: The requirement not to affect normal UE operation also applies for the acquisition of sidelink discovery related system and synchronisation information from inter-frequency cells.

NOTE 2: The UE is not required to monitor all pools simultaneously.

NOTE 3: It is up to UE implementation to decide whether a cell is sufficiently good to be used to monitor sidelink direct discovery announcements.

NOTE 4: If discRxPool includes one or more entries including rxParameters, the UE may only monitor such entries if the associated SLSSIDs are detected. When monitoring such pool(s) the UE applies the timing of the corresponding SLSS.

5.X.6 Direct Discovery Announcement

A UE capable of sidelink direct discovery that is configured by upper layers to transmit sidelink direct discovery announcements may:

NOTE 1: In case the configured resources are insufficient it is up to UE implementation to decide which sidelink direct discovery announcements to transmit.

1> if the UE's serving cell (RRC_IDLE) or PCell (RRC_CONNECTED) is suitable as defined in TS 36.304 [4]:
  2> if the UE is in RRC_CONNECTED (i.e. PCell is used for sidelink direct discovery announcement):
    3> if the UE is configured with discTxResources set to scheduled:
      4> configure lower layers to transmit the sidelink direct discovery announcement using the assigned resources indicated by scheduled in discTxResources:
    3> else if the UE is configured with discTxPoolDedicated (i.e. discTxResources set to ue-Selected):
      4> if poolSelection within poolToAddModList is set to rsrpBased:
        5> select an entry of poolToAddModList for which the RSRP measurement of the PCell, after applying the layer 3 filter defined by quantityConfig as specified in 5.5.3.2, is in-between threshLow and threshHigh:
      4> else:
        5> randomly select, using a uniform distribution, an entry of poolToAddModList:
      4> configure lower layers to transmit the sidelink direct discovery announcement using the selected pool of resources:
  2> else if T300 is not running (i.e. UE in RRC_IDLE, announcing via serving cell):
    3> if SystemInformationBlockType19 of the serving cell includes discTxPoolCommon:
      4> if poolSelection is set to rsrpBased:
        5> select an entry of discTxPoolCommon for which RSRP measurement of the serving cell is in-between threshLow and threshHigh:
      4> else:
        5> randomly select, using a uniform distribution, an entry of discTxPoolCommon:
      4> configure lower layers to transmit the sidelink direct discovery announcement using the selected pool of resources;

NOTE 2: When performing resource pool selection based on RSRP, the UE uses the latest results of the available measurements used for cell reselection evaluation in RRC_IDLE/for measurement report triggering evaluation in RRC_CONNECTED, which are performed in accordance with the performance requirements specified in TS 36.133 [16].

9.x Sidelink Pre-Configured Parameters 9.x.1 Specified Parameters

This section only list parameters which value is specified in the standard.

Parameters

| Name | Value | Semantics description | Ver |
|---|---|---|---|
| preconfigSync | | | 0 |
| >syncTxParameters | | | |
| >>alpha | | | |

| Name | Value | Semantics description | Ver |
|---|---|---|---|
| preconfigSync | | | |
| >syncTxParameters | | | |
| >>alpha | 0 | | |
| PreconfigComm | | | |
| >sc-TxParameters | | | |
| >>alpha | 0 | | |
| >dataTxParameters | | | |
| >>alpha | 0 | | |

9.x.2 Pre-Configurable Parameters

This ASN.1 segment is the start of the E-UTRA definitions of pre-configured sidelink parameters.

NOTE 1: Upper layers are assumed to provide a set of pre-configured parameters that are valid at the current UE location if any, see TS 24.334 [M, 10.2].

```
-- ASN1START
EUTRA-Sidelink-Preconf DEFINITIONS AUTOMATIC TAGS ::=
BEGIN

IMPORTS
    AdditionalSpectrumEmission,
    ARFCN-ValueEUTRA-r9,
    FilterCoefficient,
    maxSL-TxPool-r12,
    P-Max,
    SL-CP-Len-r12,
    SL-HoppingConfigComm-r12,
    SL-OffsetIndicatorSync-r12,
    SL-PeriodComm-r12,
    RSRP-RangeSL3-r12,
    SL-TF-ResourceConfig-r12,
    SL-TRPT-Subset-r12,
    P0-SL-r12,
    TDD-ConfigSL-r12
FROM EUTRA-RRC-Definitions;
-- ASN1STOP
```

SL-Preconfiguration

The IE SL-Preconfiguration includes the sidelink pre-configured parameters.

SL-Preconfiguration Information Elements

```
-- ASN1START
SL-Preconfiguration-r12 ::=         SEQUENCE {
    preconfigGeneral-r12                SL-PreconfigGeneral-r12,
    preconfigSync-r12                   SL-PreconfigSync-r12,
    preconfigComm-r12                   SL-PreconfigCommPoolList4-r12,
    ...
}
SL-PreconfigGeneral-r12 ::=         SEQUENCE {
    -- PDCP configuration
    rohc-Profiles-r12                   SEQUENCE {
        profile0x0001                       BOOLEAN,
        profile0x0002                       BOOLEAN,
        profile0x0004                       BOOLEAN,
        profile0x0006                       BOOLEAN,
        profile0x0101                       BOOLEAN,
        profile0x0102                       BOOLEAN,
        profile0x0104                       BOOLEAN
    },
    -- Physical configuration
    carrierFreq-r12                     ARFCN-ValueEUTRA-r9,
    maxTxPower-r12                      P-Max,
    additionalSpectrumEmission-r12      AdditionalSpectrumEmission,
    sl-bandwidth-r12                    ENUMERATED {n6, n15, n25, n50, n75, n100},
    tdd-ConfigSL-r12                    TDD-ConfigSL-r12,
    reserved-r12                        BIT STRING (SIZE (19)),
    ...
}
SL-PreconfigSync-r12 ::=    SEQUENCE {
    syncCP-Len-r12                      SL-CP-Len-r12,
    syncOffsetIndicator1-r12            SL-OffsetIndicatorSync-r12,
    syncOffsetIndicator2-r12            SL-OffsetIndicatorSync-r12,
    syncTxParameters-r12                P0-SL-r12,
    syncTxThreshOoC-r12                     RSRP-RangeSL3-r12,
    filterCoefficient-r12               FilterCoefficient,
    syncRefMinHyst-r12                      ENUMERATED (dB0, dB3, dB6, dB9,
dB12},
    syncRefDiffHyst-r12                     ENUMERATED {dB0, dB3, dB6, dB9, dB12,
dBinf},
    ...
}
SL-PreconfigCommPoolList4-r12 ::=        SEQUENCE (SIZE (1..maxSL-TxPool-r12))
OF SL-PreconfigCommPool-r12
SL-PreconfigCommPool-r12 ::=             SEQUENCE {
-- This IE is same as SL-CommResourcePool with rxParametersNCell absent
    sc-CP-Len-r12                       SL-CP-Len-r12,
    sc-Period-r12                       SL-PeriodComm-r12,
    sc-TF-ResourceConfig-r12            SL-TF-ResourceConfig-r12,
    sc-TxParameters-r12                 P0-SL-r12,
    data-CP-Len-r12                     SL-CP-Len-r12,
    data-TF-ResourceConfig-r12          SL-TF-ResourceConfig-r12,
    dataHoppingConfig-r12               SL-HoppingConfigComm-r12,
```

```
    dataTxParameters-r12           P0-SL-r12,
    trpt-Subset-r12                SL-TRPT-Subset-r12,
    ...
}
END
-- ASN1STOP
```

| SL-Preconfiguration field descriptions |
| --- |
| CarrierFreq |
| Indicates the carrier frequency for sidelink operation. In case of FDD it is uplink carrier frequency and the corresponding downlink frequency can be determined from the default TX-RX frequency separation defined in TS 36.101 [42, table 5.7.3-1]. |
| PreconfigComm |
| Indicates a list of a number of individual resource pools. The same set of pools is used for for reception and transmission of sidelink direct communication. |
| SyncRefDiffHyst |
| Hysteresis when evaluating a SyncRef UE using relative comparison. Value dB0 corresponds to 0 dB, dB3 to 3 dB and so on, value dBinf corresponds to infinite dB. |
| SyncRefMinHyst |
| Hysteresis when evaluating a SyncRef UE using absolute comparison. Value dB0 corresponds to 0 dB, dB3 to 3 dB and so on. |

The sidelink direct discovery for the in coverage discovery scenario may also follows the following procedure.

5.3 ProSe Direct Discovery
5.3.1 General
5.3.1.1 Overview

ProSe Direct Discovery is defined as the process that detects and identifies another UE in proximity using E-UTRA direct radio signals.

There are two types of ProSe Direct Discovery: open and restricted. Open is the case where there is no explicit permission that is needed from the UE being discovered, whereas restricted discovery only takes place with explicit permission from the UE that is being discovered.

ProSe Direct Discovery can be a standalone service enabler that could for example use information from the discovered UE for certain applications in the UE that are permitted to use this information e.g. "find a taxi nearby", "find me a coffee shop". Additionally depending on the information obtained ProSe Direct Discovery can be used for subsequent actions e.g. to initiate ProSe Direct Communication.

The UE can act as "announcing UE" only in the band designated by the serving PLMN but may act as a "monitoring" UE also in the resources of the serving PLMN and Local PLMNs.

ProSe-enabled non-Public Safety UEs which have obtained authorization to participate in ProSe Direct Discovery procedures may not continue in participating in ProSe Direct Discovery procedures as soon as they detect loss of E-UTRA coverage in the serving PLMN.

5.3.1.2 ProSe Direct Discovery Models

The following models for ProSe Direct Discovery exist:

Model A ("I am here")
This model defines two roles for the ProSe-enabled UEs that are participating in ProSe Direct Discovery.
  Announcing UE: The UE announces certain information that could be used by UEs in proximity that have permission to discover.
  Monitoring UE: The UE that monitors certain information of interest in proximity of announcing UEs.
In this model the announcing UE broadcasts discovery messages at pre-defined discovery intervals and the monitoring UEs that are interested in these messages read them and process them.
  NOTE: This model is equivalent to "I am here" since the announcing UE would broadcast information about itself e.g. its ProSe Application Code in the discovery message.

Model B ("who is there?"/"are you there?")
This model defines two roles for the ProSe-enabled UEs that are participating in ProSe Direct Discovery.
  Discoverer UE: The UE transmits a request containing certain information about what it is interested to discover.
  Discoveree UE: The UE that receives the request message can respond with some information related to the discoverer's request.
It is equivalent to "who is there/are you there" since the discoverer UE sends information about other UEs that would like to receive responses from, e.g. the information can be about a ProSe Application Identity corresponding to a group and the members of the group can respond Using the technology disclosed herein ProSe Direct Discovery may be extended to an out-of-coverage (OCC) scenario. In one of its aspects the technology disclosed herein provides solutions for out-of-coverage sidelink direct discovery radio resource pool allocation. Similar to radio resource pool allocation for out-of-coverage SL non-discovery communications (e.g., "DL communications"), in some example embodiments and modes a preconfigured resource pool(s) is introduced for out of coverage SL discovery. However, in one of its aspects the technology disclosed herein focuses on the difference between communication and discovery services, making it applicable for beyond Release 12 out of coverage discovery. As described herein, out-of-coverage radio resources are obtained using one or more of preconfigured radio resource pools, from a PSBCH broadcast by a radio access node, and a discovery signal transmitted by another sidelink direct discovery-participating wireless terminal.

The following terminology and priorities are defined for explaining aspects of the technology disclosed herein:
  "sidelink discovery transmit (Tx) pools" are resource pools used to transmit sidelink direct discovery announcements.
  "sidelink discovery receive (Rx) pools are resource pools to monitor/receive SL direct discovery announcements.
  out-of-coverage sidelink direct discovery should not affect normal operations of out-of-coverage SL direct communication.

Figure 2:
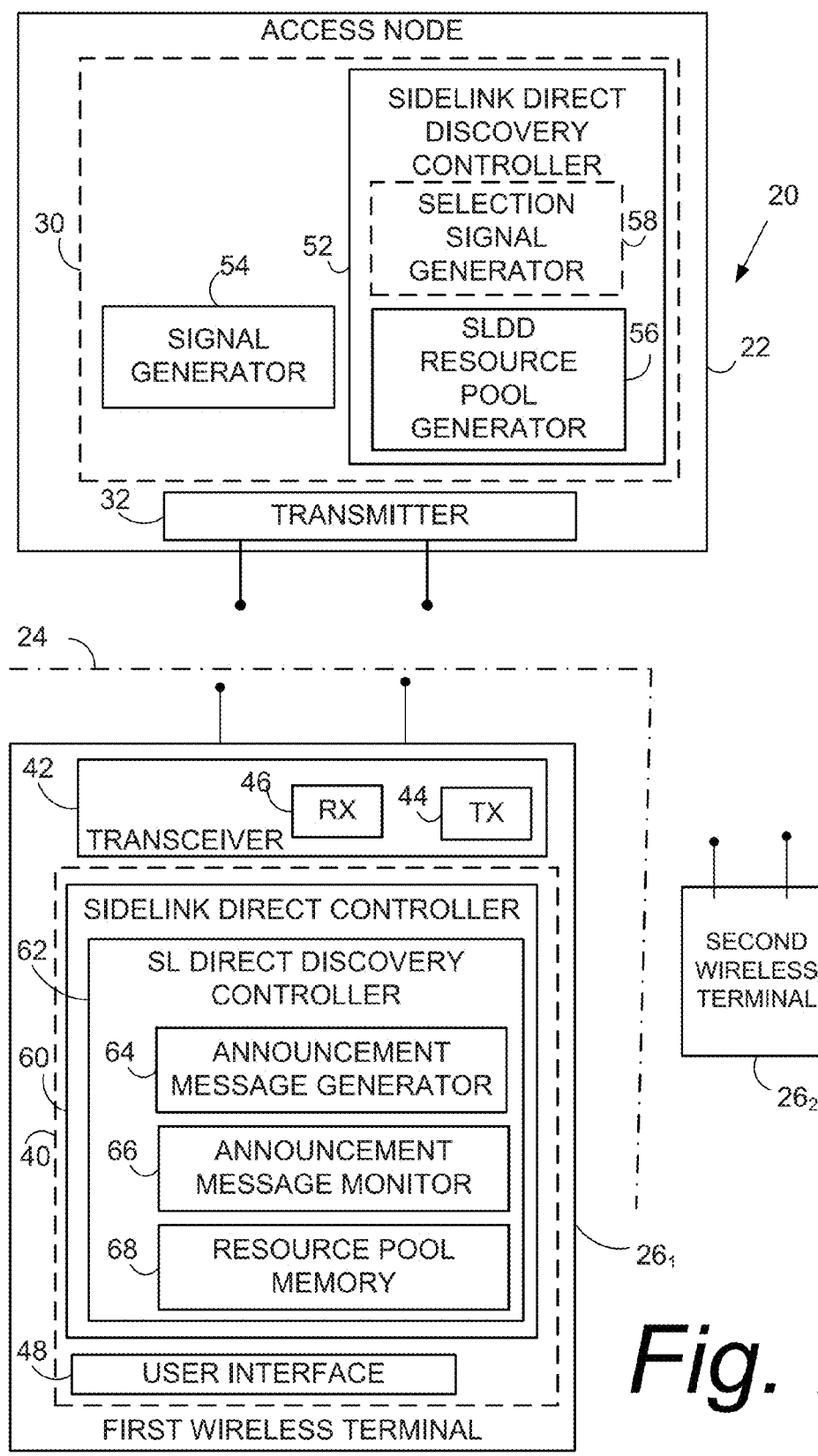
FIG. 2 is a schematic view of an example generic embodiment of a radio communications network.

FIG. 2 shows an example communications system 20 as described in the U.S. Provisional application 62/145,497 filed on even date herewith as and entitled "METHOD AND APPARATUS FOR IMPLEMENTING PARTIAL COVERAGE AND OUT-OF-COVERAGE SIDELINK DISCOV- ERY RESOURCE POOLS FOR WIRELESS COMMUNICATIONS". In this regard, FIG. 2 shows an example communications system 20 wherein radio access node 22 communicates over air or radio interface 24 with first wireless terminal $26_1$. The wireless terminal $26_1$ may also participate over air or radio interface 24 in sidelink direct communications with other wireless terminals, such as second wireless terminal $26_2$. As used herein, radio interface 24 does not necessarily refer to any one protocol interface, since radio interface 24 may represent the Uu interface between wireless terminal 26 and radio access node 22 or may represent a PC5 interface between two wireless terminals. Moreover, it will be understood that second wireless terminal $26_2$ may and likely does include essentially the same units and functionalities as illustrated for wireless terminal $26_1$.

The node 22 comprises node processor 30 and node transmitter 32. The first wireless terminal $26_1$ comprises terminal processor 40 and terminal transceiver 42. The terminal transceiver 42 typically comprises terminal transmitter section 44 and terminal receiver section 46. The terminal transmitter section 44 may comprise terminal transmitter circuitry and may be known as "transmitter"; the terminal receiver section 46 may comprise terminal receiver circuitry and may be known as "receiver". FIG. 2 further shows wireless terminal $26_1$ as comprising terminal user interface 48. The terminal user interface 48 may serve for both user input and output operations, and may comprise (for example) a screen such as a touch screen that can both display information to the user and received information entered by the user.

In general operation node 22 and first wireless terminal $26_1$ communicate with each other across radio interface 24 using "frames" of information that are typically formatted and prepared by a scheduler of node 22. The frame may be configured to include various channels. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. In the time domain, each LTE subframe is divided into two slots (so that there are thus 20 slots in a frame). The transmitted signal in each slot is described by a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a sub-carrier. A resource element (RE) is the smallest time-frequency unit for downlink transmission in the subframe S. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix. The frame and subframe structure serves only as an example of a technique of formatting of information that is to be transmitted over a radio or air interface. It should be understood that "frame" and "subframe" may even be utilized interchangeably or may include or be realized by other units of information formatting, and as such may bear other terminology (such as blocks, for example).

Since the technology disclosed herein concerns sidelink direct discovery, example units and functionalities pertaining to sidelink direct discovery are illustrated for both radio access node 22 and wireless terminal 26 in FIG. 2. It will be appreciated that typically a radio access node 22 and wireless terminal include numerous other units and functionalities such as those well known to the person skilled in the art.

In the above regard, FIG. 2 shows radio access node 22 as comprising node sidelink direct discovery controller 52 and node signal generator 54. Both node sidelink direct discovery controller 52 and node signal generator 54 may comprise the node processor 30. The sidelink direct discovery controller 52 in turn is shown as comprising sidelink direct discovery (SLDD) resource pool generator 56 and an optional selection signal generator 58.

FIG. 2 also shows wireless terminal $26_1$ as comprising terminal sidelink direct controller 60, which may comprise terminal processor 40. The terminal sidelink direct controller 60 supervises both sidelink communications and sidelink discovery, and in this latter regard comprises terminal sidelink direct discovery controller 62. The terminal sidelink direct discovery controller 62 in turn is shown as comprising, in an example embodiment, announcement message generator 64; announcement message monitor 66; and resource pool memory 68.

In one of its aspects the technology disclosed herein concerns providing a sidelink direct discovery radio resource pool to an out-of-coverage wireless terminal. As mentioned previously, a "pool" may comprise plural pools, and thus "pool" and "pool(s)" may be used interchangeably herein. Three main, non-limiting alternative techniques are described below, with some of the alternative techniques having various sub-alternatives. As also described below, two or more of the alternative techniques may be practiced in combination.

Figure 3:
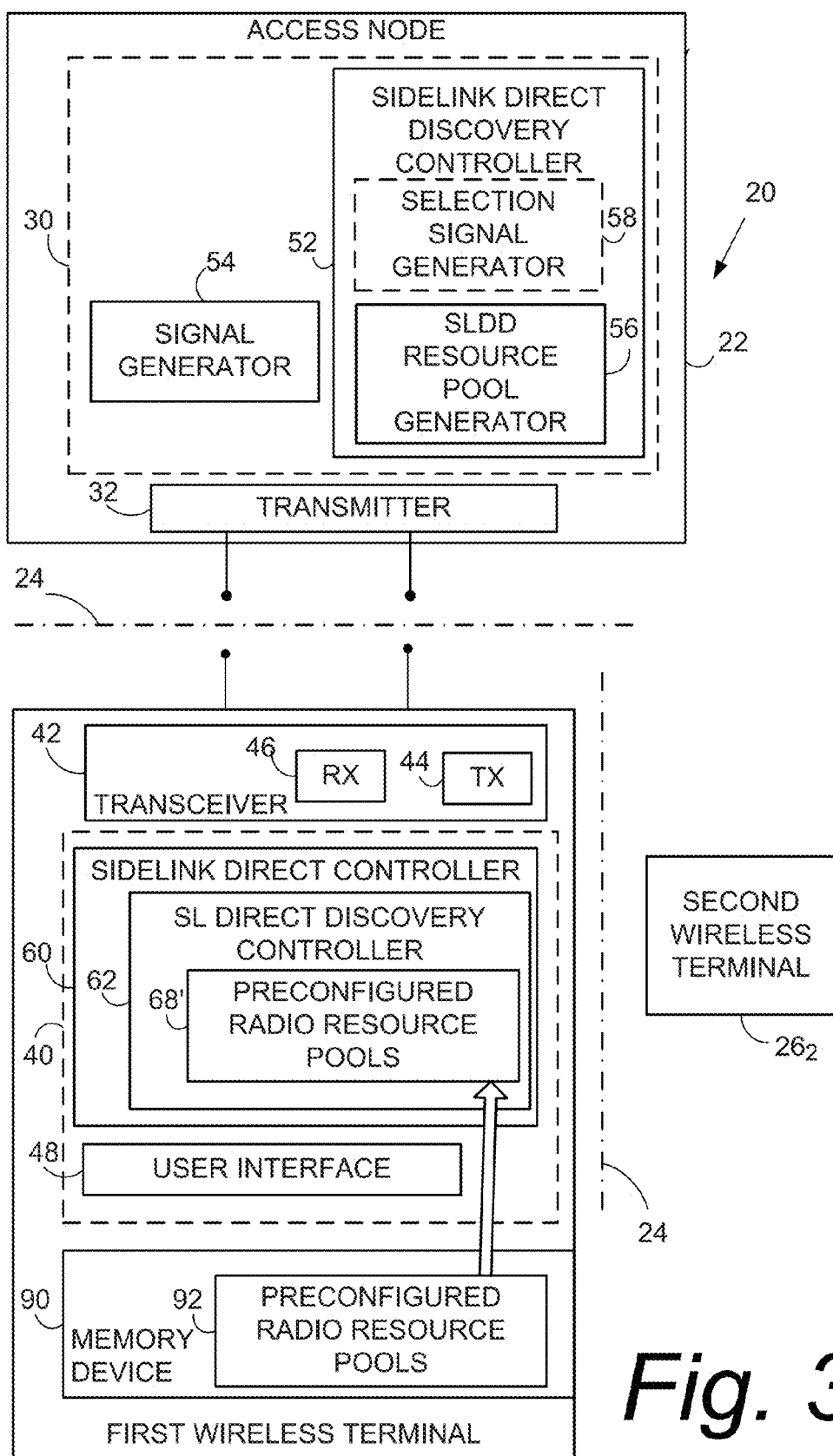
FIG. 3 is a schematic view of an example communications system comprising radio access node and wireless terminal which comprises a memory which stores a preconfigured radio resource pool or radio resource according to a first alternative example technique.

FIG. 3 shows a communications system 20 comprising radio access node 22 and wireless terminal $26_1$, both of which are generally understood with reference to the foregoing description of FIG. 2. The wireless terminal $26_1$ comprises, e.g., terminal processor 40, terminal transceiver 42, and memory device 90. The memory device 90 may comprise a card or the like which may be externally loaded into the wireless terminal. The memory device 90 may comprise, for example, a universal integrated circuit card (UICC). A UICC is described in ETSI TR 102 216[2] where it is characterized as a "smart card that conforms to the specifications written and maintained by the ETSI Smart Card Platform project. The memory device 90 may also comprise a Subscriber Identity Module Mobile Equipment (ME), as described in 3GPP TS 11.11 V8.14.0 (2007-06); 3rd Generation Partnership Project; Technical Specification Group Terminals Specification of the Subscriber Identity Module-Mobile Equipment (SIM-ME) interface (Release 1999).

Figure 4:
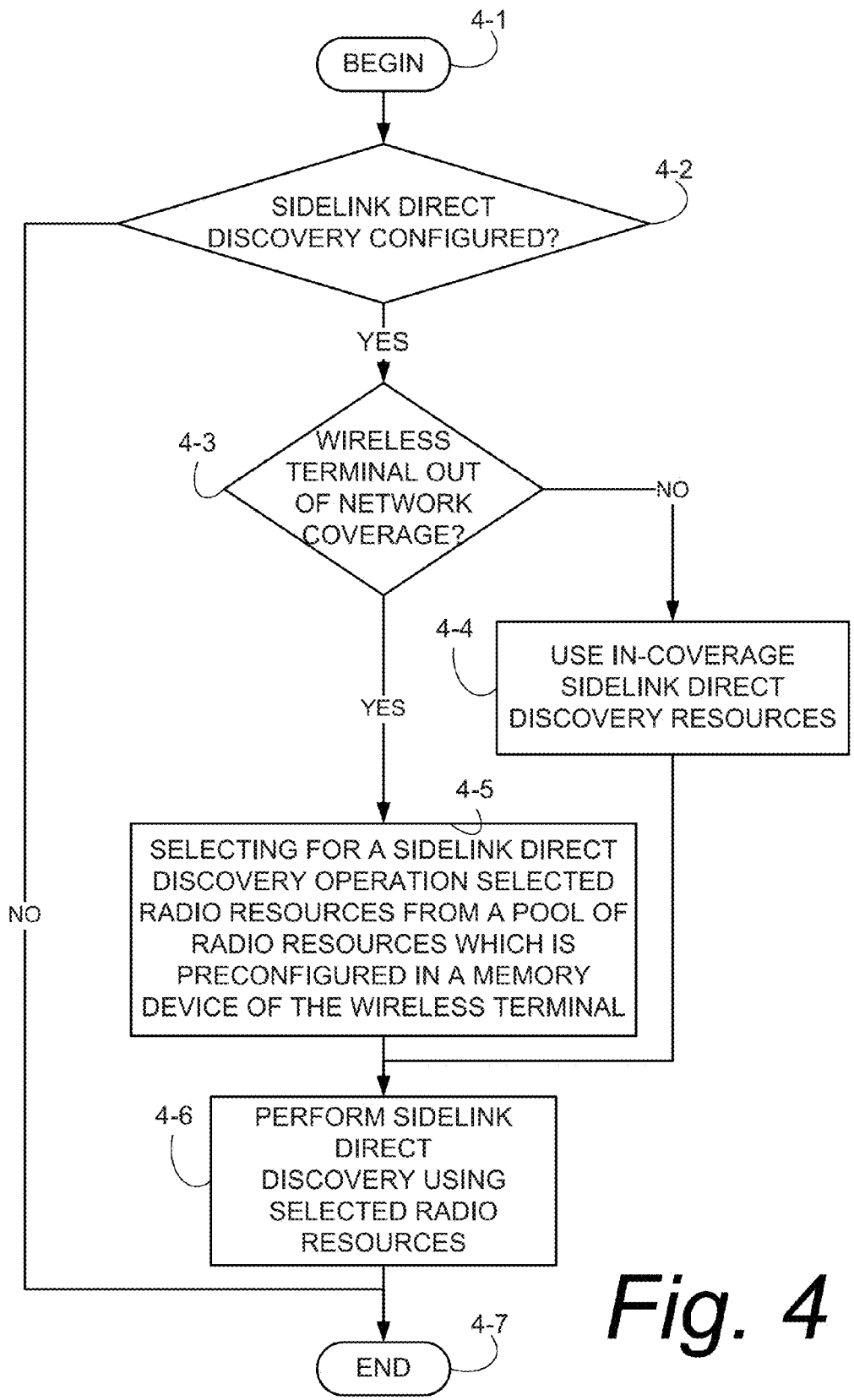
FIG. 4 is a flowchart shows example basic acts or steps that may be performed by a wireless terminal of FIG. 3 in accordance a first alternative technique.

FIG. 4 shows example basic acts or steps that may be performed by the wireless terminal 26 of FIG. 3 in accordance the first alternative technique. Act 4-1 depicts the beginning of a sidelink direct discovery routine performed by wireless terminal 261. Act 4-2 comprises making a determination regarding receipt of an indication that the wireless terminal is to be configured for sidelink direct discovery. The indication may be received from a higher layer, such as ProSe protocol, for example. If the wireless terminal is not to be configured for sidelink direct discovery, the routine of FIG. 4 ends as depicted by act 4-7. Otherwise, as act 4-3 a determination is made whether the wireless terminal is out of network coverage. If the wireless terminal is in network coverage, in-coverage sidelink direct discovery resources are utilized as depicted by act 4-4 for performing the sidelink direct discovery as act 4-6. If the wireless terminal is out-of-coverage coverage, as act 4-5 the terminal processor 40 selects, for a sidelink direct discovery operation, a selected out-of-coverage radio resource. Thereafter, the sidelink direct discovery is performed as act 4-6 using the out-of-coverage resources selected by act 4-5.

An in coverage wireless terminal obtains its resource pool list information from broadcast and dedicated RRC signaling. The radio resource pool information obtained by the wireless terminal while the wireless terminal is in coverage may be an in coverage usable radio resource pool, an out-of-coverage usable radio resource pool, or a combination of in coverage usable radio resource pools and out-of-coverage usable radio resource pools (preferably differentiated as such).

When an in coverage wireless terminal goes out of coverage, it may operate in either of two alternative scenarios. As a first alternative scenario, the wireless terminal when out-of-coverage should not use the resource pool information received when in coverage any more, and should obtain out of coverage resource pool information through one or combinations of the three out-of-coverage pool obtaining techniques described herein. Those techniques include resource pool preconfiguration (Alt 1); resource pool indicated by PSBCH; and resource pool indicated by direct discovery signal (Alt 3).

As a second alternative scenario, the wireless terminal when out-of-coverage should may continue to use any out-of-coverage radio resource pool information that it received when in coverage for sake of discovery service continuity when out of coverage. Preferably, once the out-of-coverage wireless terminal receives further out-of-coverage resource pool information, e.g., through one or combinations of the three out-of-coverage pool obtaining techniques just mentioned, the out-of-coverage wireless terminal should stop using the resource pool information received in coverage and start using the further and subsequently received out-of-coverage resource pool information.

Thus, act 4-5 may be selection of an appropriate out-of-coverage radio resource pool as obtained when the wireless terminal is in-coverage (IC), or may be according to one or more of the example alternative techniques (Alt 1, Alt 2, or Alt 3) described herein.

$1^{st}$ Alternative (Alt 1): Resource Pool Preconfiguration

In a first example alternative technique (Alt 1), an out-of-coverage wireless terminal which is capable of sidelink direct discovery that is configured by upper layers to monitor sidelink direct discovery announcements, or to transmit sidelink direct discovery announcements, may configure lower layers to monitor sidelink direct discovery announcements, or to transmit sidelink direct discovery announcements, using a pool of preconfigured resources (e.g., preconfigured in a UICC or ME) for out of coverage ProSe Direct Discovery.

Thus, for Alternative Alt1 act 4-5 comprises the terminal processor 40 selecting, for a sidelink direct discovery operation, a selected out-of-coverage radio resource from a pool of radio resources which is preconfigured in a memory of the wireless terminal. The memory in which the out-of-coverage radio resource pool may be configured may be a memory device such as memory device 90 of wireless terminal, or may be another memory (such as resource pool memory 68). As used herein, "preconfigured" encompasses any default radio resource pool which may initially be loaded into memory device 90 and then transferred or uploaded into resource pool memory 68 for access by terminal processor 40, or any radio resource pool that is stored in resource pool memory 68 as a result of updating or replacement from other sources. When in coverage, such other source may be a node such as radio access node 22, but if the wireless terminal is out-of-coverage then such other sources may be, for example, other wireless terminals such as wireless terminal $26_2$.

Thus, from FIG. 4 it may be appreciated that, in a basic mode, the method of operating the wireless terminal 26 comprises receiving an indication that the wireless terminal is to be configured for sidelink direct discovery; making a determination that the wireless terminal is out of network coverage; and, in accordance with the determination, obtaining for a sidelink direct discovery operation a selected radio resource for from a pool of radio resources which is preconfigured in a memory device.

The basic mode of the method also may comprise using the selected radio resources for the sidelink direct discovery operation. The selected radio resources may be used by wireless terminal $26_1$ for either transmitting a sidelink direct discovery announcement, or for monitoring a sidelink direct discovery announcement sent by another wireless terminal (e.g., second wireless terminal $26_2$ of FIG. 2) by listening to the selected radio resource and, if an announcement is heard thereon, receiving the announcement.

$1^{st}$ Alternative: Sub-Alternative (Alt 1.1)

In a first sub-alternative of the first alternative technique, e.g., sub-alternative Alt 1.1, the whole SL discovery Tx pools and the whole SL discovery Rx pools are the same, without identifying the relationship between frequency information and resource pools. In other words, the out-of-coverage UEs randomly, or according to some criteria, e.g., RSRP (received signal received power) of the resource pool, choose preconfigured resource pools to transmit SL direct discovery announcements no matter in which frequency for transmission. Or the out-of-coverage UEs may be only configured by higher layers to transmit on one fixed frequency. The out-of-coverage UEs expecting to receive direct discovery announcements may monitor the whole Tx pools as their Rx pools.

Figure 5:
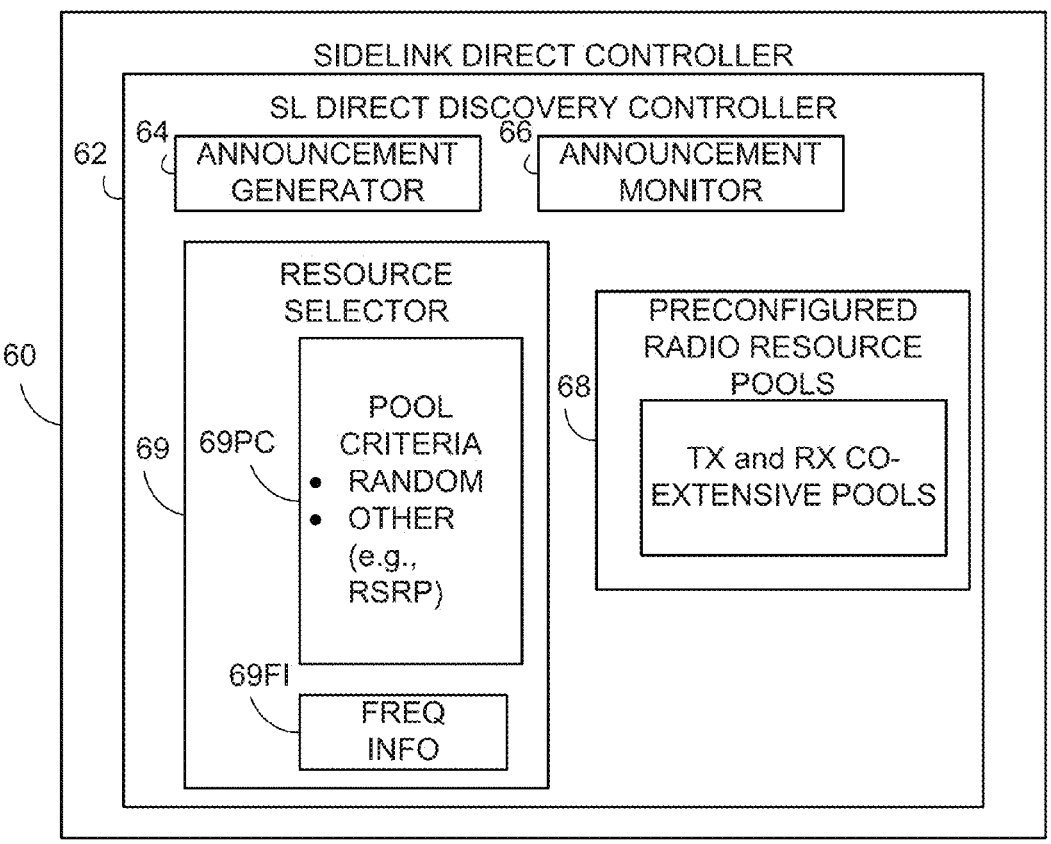
FIG. 5 is a diagrammatic view of a terminal sidelink direct controller of a wireless terminal in an example embodiment in which sidelink discovery transmit (TX) pools and sidelink discovery receive (RX) pools are the same.

FIG. 5 shows one example implementation of the sub-alternative Alt. 1.1, and particularly shows terminal sidelink direct discovery controller 62 as comprising announcement message generator 64, announcement message monitor 66, resource pool memory 68 (which as illustrated stores preconfigured radio resource pools), and resource selector 69. In the FIG. 5 implementation the whole sidelink discovery transmit (TX) pools and whole sidelink discovery receive (RX) pools are the same. In other words, the pools of transmit radio resources and the pools of receive radio resources are co-extensive.

FIG. 5 also shows potential factors utilized by resource selector 69 in making its selection of radio resource for out-of-coverage sidelink direct discovery. One factor is the factor of pool criteria 69PC. Thus, in one example mode the method of operating the wireless terminal further comprises selecting according to a predetermined criteria (e.g., pool criteria 69PC) the selected radio resources from the pool of radio resources which is preconfigured through the memory device 90.

The pool criteria factor 69C may comprise random selection of the radio resource pool resources preconfigured in resource pool memory 68 (e.g., to randomly transmit sidelink direct discovery announcements without regard to transmission frequency. Thus, in one example mode of operation the method further comprises selecting randomly the selected radio resources from the pool of radio resources which are preconfigured in the memory 68.

Another factor may be frequency information factor 69FI, which may be utilized in case the out-of-coverage wireless terminal is configured by higher layers (e.g., by the ProSe protocol) to transmit on one fixed frequency. In the FIG. 5 example implementation, the out-of-coverage wireless terminal $26_1$ when expecting to receive a sidelink direct discovery announcement from another terminal (e.g., second wireless terminal $26_2$) may monitor all transmit pools as their receive pools (since the transmit pools and receive pools are coextensive in the FIG. 5 implementation.

Figure 6:
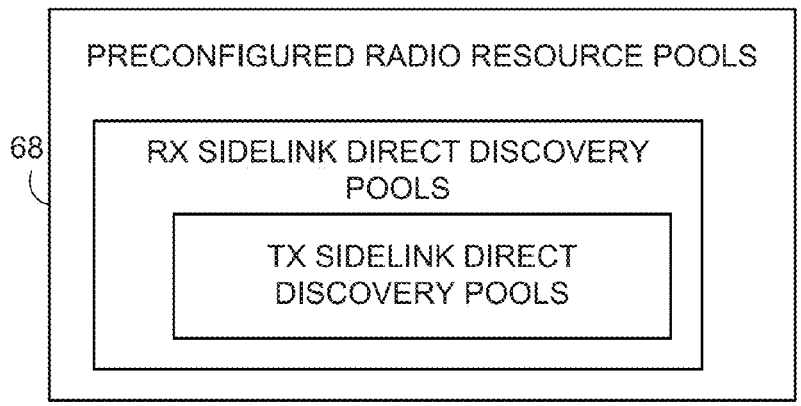
FIG. 6 is a diagrammatic view of a terminal sidelink direct controller of a wireless terminal in an example embodiment in which sidelink discovery transmit (TX) pools are a subset of sidelink discovery receive (RX) pools.

FIG. 6 shows an example implementation of the sub-alternative Alt. 1.1 in which sidelink discovery transmit (TX) pools are a subset of sidelink discovery receive (RX) pools.

$1^{st}$ Alternative: Sub-Alternative (Alt 1.2)

In a second sub-alternative of the first alternative technique, e.g., sub-alternative Alt 1.2, frequency information is preconfigured in the resource pool memory 68 (which may be obtained from a memory device 90 such as a UICC or ME) as well with some particular mapping relationship to resource pools. In other words, the out-of-coverage wireless terminal transmits a direct discovery announcement on some particular frequency(ies) indicated by higher layer, or according to the priority list of preconfigured frequency information and available resource pools, using the Tx resource pools mapped to that (those) frequency(ies). The out-of-coverage UEs expecting to receive direct discovery announcements may monitor the whole Tx pools as their Rx pools (similar to the co-extensive pool situation shown in FIG. 5), or some Rx pools which may cover the Tx pools associated with some frequency(ies) which they are interested in. In the second sub-alternative of the first alternative technique, the sidelink direct discovery transmit (TX) radio resource pools and sidelink direct discovery receive (RX) radio resource pools may be coextensive, or the sidelink direct transmit (TX) radio resource pools may be a subset of the sidelink direct discovery receive (RX) radio resource pools.

Figure 7:
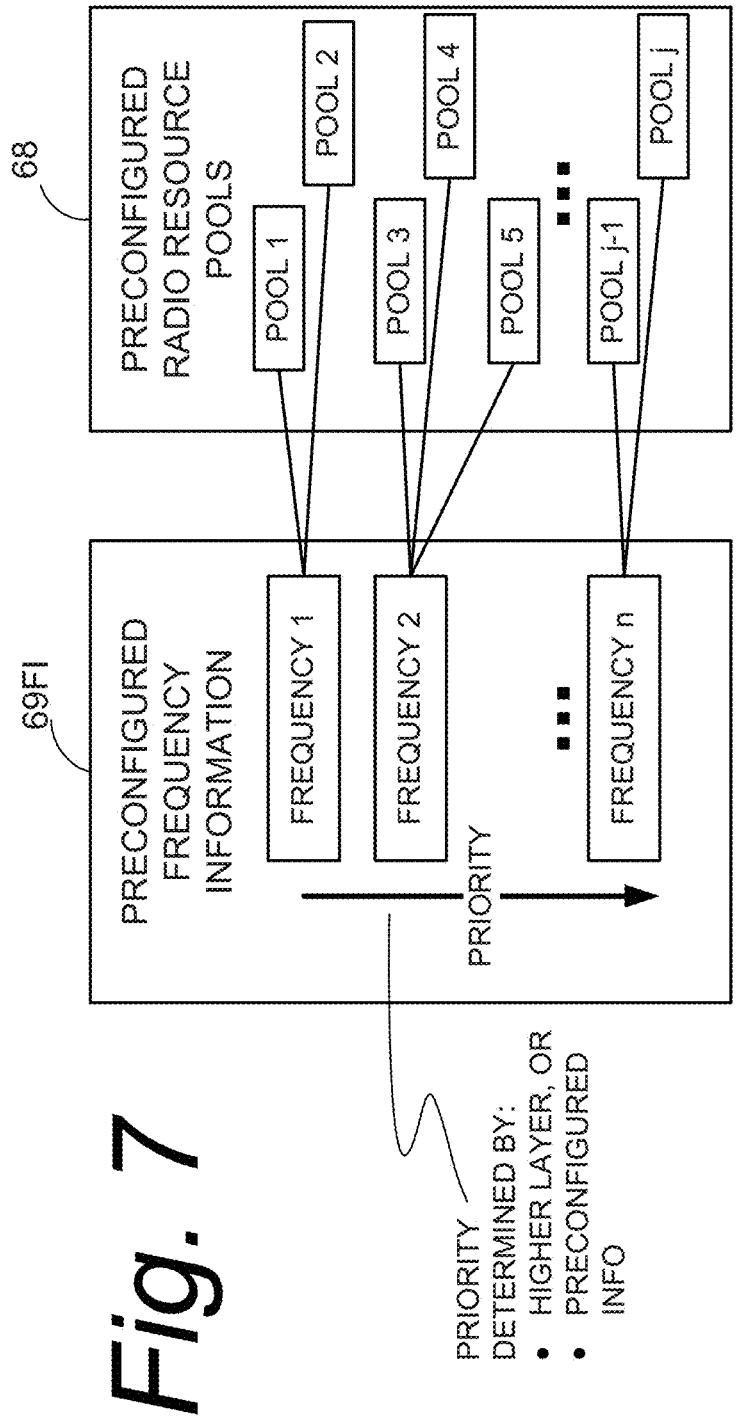
FIG. 7 is a diagrammatic view showing mapping of radio resource pools to frequencies in accordance with an example sub-alternative of a first example technique.

FIG. 7 shows an example implementation of the second sub-alternative of the first alternative technique. FIG. 7 shows both the preconfigured radio information factor 69FI and the preconfigured resource pools 68. In the FIG. 7 implementation, the method of operating the wireless terminal further comprises obtaining for the sidelink direct discovery operation from the memory device both (1) preconfigured radio frequency information for use in the sidelink direct discovery operation; and (2) a mapping of radio resources, which are to be obtained as the selected radio resources, to the preconfigured radio frequency information. For example, FIG. 7 shows an example case in which radio resource pool 1 and radio resource pool 2 may be mapped to frequency 1; in which radio resource pool 3, radio resource pool 4, and radio resource pool 5 may be mapped to frequency 2; and radio resource pool j−1 and radio resource pool j may be mapped to frequency n. As shown in FIG. 7, the priority of usage of the frequencies 1, 2, and n may be either determined by a higher layer (e.g., the ProSe protocol), or may be preconfigured information (and, as such, may be gleaned from memory device 90).

Figure 8:
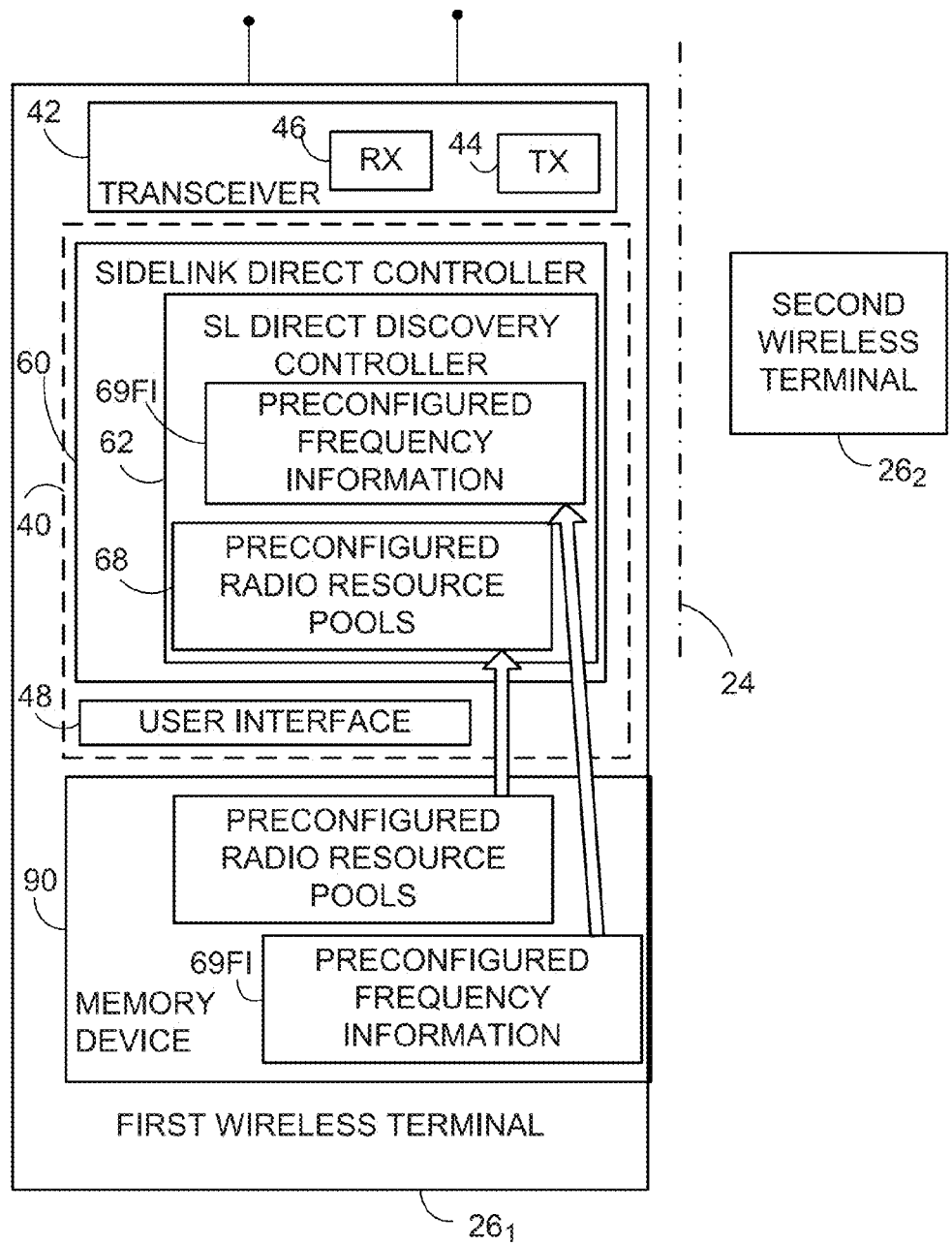
FIG. 8 is a schematic view of a communications network in which radio resource pool information and frequency information that is preconfigured in memory of a wireless terminal may be loaded into a sidelink direct discovery controller of the wireless terminal.

FIG. 8 illustrates that radio resource pool information and frequency information that is preconfigured in memory device 90 may be loaded into terminal sidelink direct discovery controller 62. The radio resource pool information obtained from memory device 90 may be loaded into resource pool memory 68, and the frequency information obtained from memory device 90 is provided to the resource selector 69 to become frequency information factor 69FI. Of course, the both the radio resource pool information and the frequency information may be obtained elsewhere (from the radio access node 22 when the wireless terminal $26_1$ is in coverage or from another wireless terminal when the wireless terminal $26_1$ is out-of-coverage) and loaded into resource pool memory 68. Thus, the radio resource pool information and frequency information, at one or both of memory device 90 and terminal sidelink direct discovery controller 62, may be re-configured, e.g., by radio access node 22 or by another wireless terminal, in accordance with network or other considerations.

$2^{nd}$ Alternative (Alt 2): Resource Pool Indicated by PSBCH

A wireless terminal which is in network coverage generally obtains its in-coverage resource pool list information from broadcast and dedicated RRC signaling. When an in-coverage wireless terminal goes out of network coverage, normally the wireless terminal travelling out-of-coverage should not use the in coverage resource pool information any more, but must obtain out of coverage resource pool information. The technology disclosed herein provides three main or general alternative techniques for obtaining such out-of-coverage radio resource pool information. The out-of-coverage radio resource pools may be used for sidelink direct discovery while the wireless terminal is out-of-coverage.

An in coverage a wireless terminal may, according to 3GPP release 12, receive from another wireless terminal a Physical Sidelink Broadcast Channel (PSBCH) which is associated with a sidelink direct communication synchronization signal (SLSS). As discussed in Release 12, the in coverage (IC) direct discovery SL synchronization signal does not have to be associated with PSBCH to carry system information because the radio access node 22 can broadcast necessary information through system information block (SIB) 18 and system information block (SIB) 19 for sidelink operations.

The second alternative technique (Alt. 2) hereof uses a Physical Sidelink Broadcast Channel (PSBCH) to carry additional information, and particularly out-of-coverage radio resource pool information to be used by the wireless terminal when out-of-coverage. The radio resource pool for the out-of-coverage radio resource pool information may be carried on either a Physical Sidelink Broadcast Channel (PSBCH) associated with a sidelink direct discovery SLSS, or a Physical Sidelink Broadcast Channel (PSBCH) associated with a sidelink direct communication SLSS. As one example implementation of Alternative technique Alt 2, a sidelink synchronization signal (SLSS) for SL direct discovery is associated with a Physical Sidelink Broadcast Channel (PSBCH). The Physical Sidelink Broadcast Channel (PSBCH) carries resource pool information (e.g., resource pool lists) for out-of-coverage wireless terminal. Such radio resource pool information may comprise and/or essentially reuse resource pool information carried in SIB 19 (associated with frequency information) for IC direct discovery, and out-of-coverage wireless terminals can take similar actions as in-coverage wireless terminals after receiving SIB 19.

Figure 9:
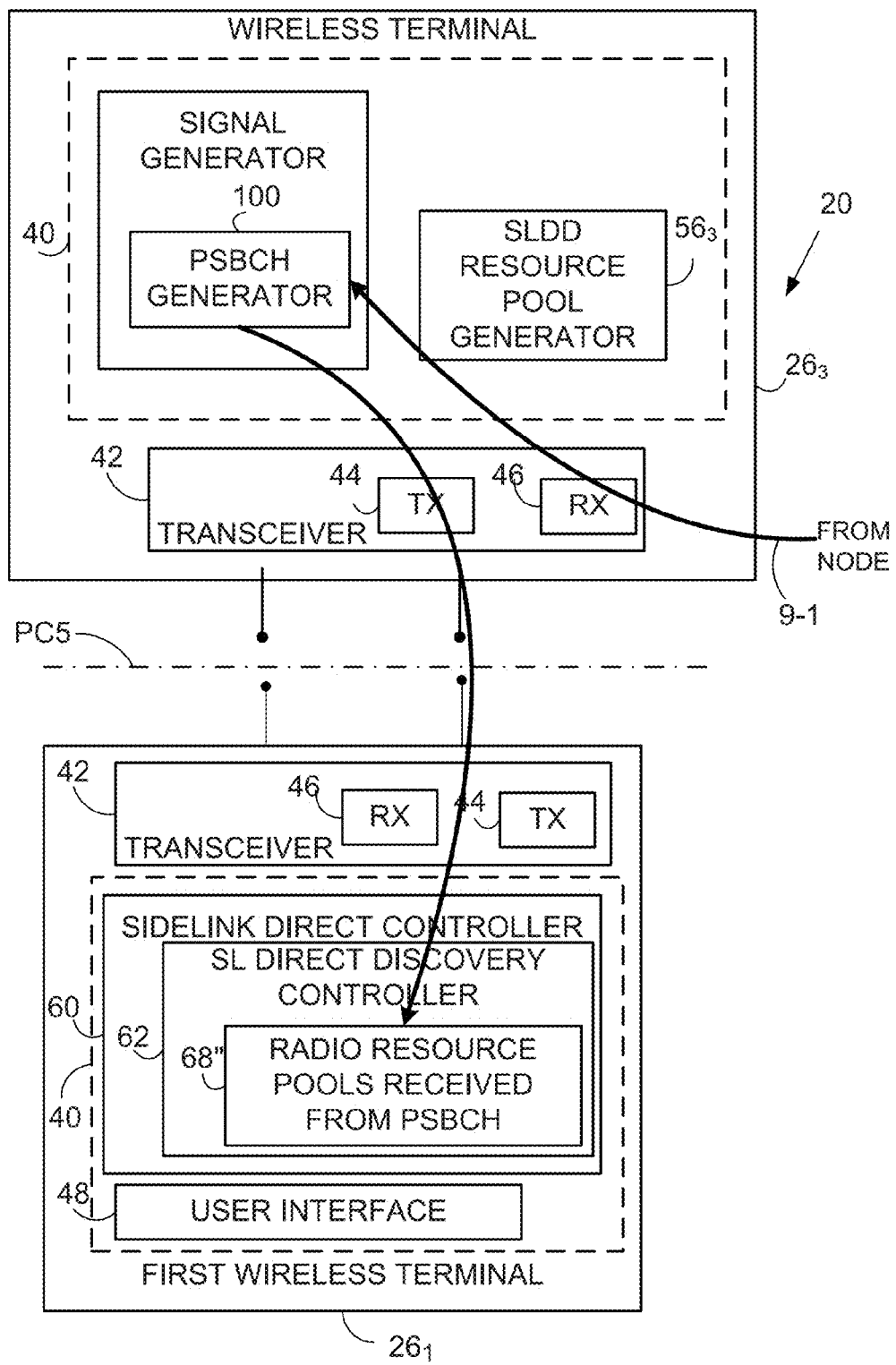
FIG. 9 is a schematic view of an example communications system wherein a wireless terminal sends out-of-coverage radio resource pool in a Physical Sidelink Broadcast Channel (PSBCH) according to a second alternative example technique.

FIG. 9 shows an example embodiment and mode which implements the second alternative technique (Alt 2). In the FIG. 9 embodiment, the Physical Sidelink Broadcast Channel (PSBCH) is prepared by wireless terminal $26_3$ and sent through the PC5 interface to wireless terminal $26_1$. In operation, as indicated by arrow 9-1 the in-coverage wireless terminal $26_3$ may receive legacy BCH and/or dedicated signaling information from radio access node 22, which may include resource pool information. The wireless terminal $26_3$ then prepares PSBCH including out of coverage resource pool information to transmit to wireless terminal $26_1$. In this regard the wireless terminal $26_3$ may deduce from signaling received from the node what out-of-coverage radio resource pool information is to be included in the Physical Sidelink Broadcast Channel (PSBCH). That is, the wireless terminal $26_3$ may either simply include any out-of-coverage radio resource pool information it receives from the node in the Physical Sidelink Broadcast Channel (PSBCH), or the sidelink direct discovery (SLDD) resource pool generator $56_3$ of wireless terminal $26_3$ may modify such received out-of-coverage radio resource pool information, or even generate on its own accord appropriate out-of-coverage radio resource pool information, for inclusion in the Physical Sidelink Broadcast Channel (PSBCH).

The wireless terminal $26_3$ then forwards such out of coverage resource pool information to out-of-coverage wireless terminals, such as wireless terminal $26_1$. The information obtained through the Physical Sidelink Broadcast Channel (PSBCH) including the out-of-coverage radio resource pool information can then further be transmitted in out of coverage scenario from wireless terminal $26_1$ through (1) PSBCH associated with SLSS for SL communications (current spec-defined) (2) PSBCH associated with SLSS for SLDD if so permitted.

Figure 10:
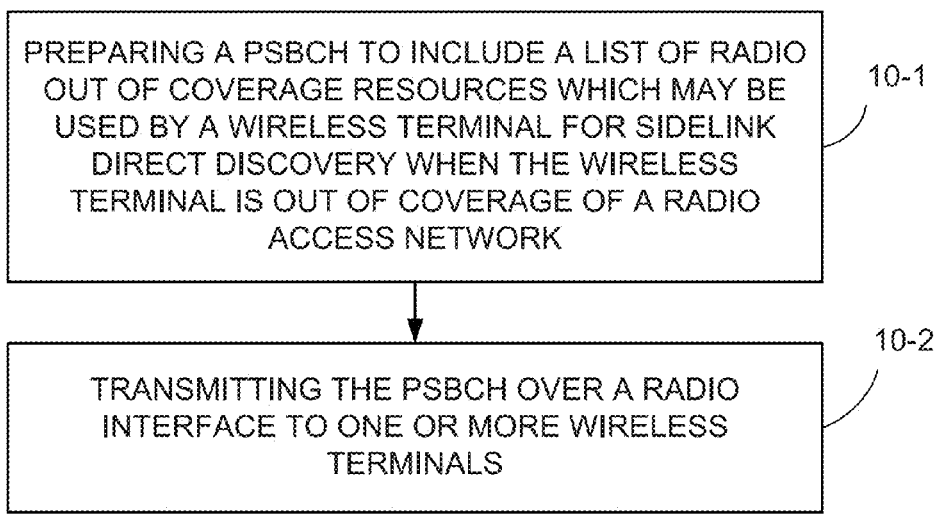
FIG. 10 is a flowchart shows example basic acts or steps that may be performed by a PSBCH-sending wireless terminal of FIG. 9 in accordance the second alternative technique.

Example acts or steps performed by wireless terminal $26_3$ in conjunction with the second alternative technique Alt 2 are shown in FIG. 10. Act 10-2 comprise terminal processor 40 of wireless terminal $26_3$ of FIG. 9 preparing a Physical Sidelink Broadcast Channel (PSBCH) in such a manner that the PSBCH includes a list of out-of-coverage radio resources which may be used by a wireless terminal for sidelink direct discovery when the wireless terminal is out of coverage of a radio access network comprising the access node. The list of out-of-coverage radio resources may be from a network node as indicated above, or obtained from sidelink direct discovery (SLDD) resource pool generator $56_3$, and the Physical Sidelink Broadcast Channel (PSBCH) is prepared by PSBCH generator 100. As act 10-2, terminal transmitter section 44 of wireless terminal $26_3$ transmits the PSBCH over a radio interface to wireless terminal $26_1$.

Figure 11:
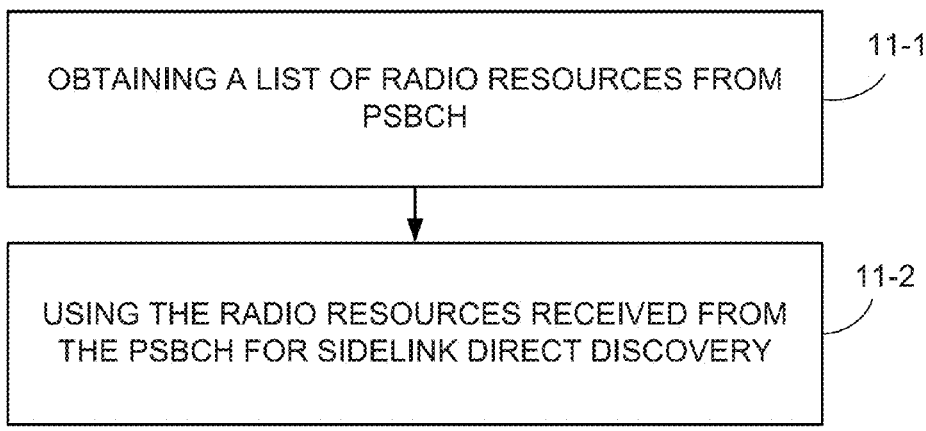
FIG. 11 is a flowchart shows example basic acts or steps that may be performed by a PSBCH-receiving wireless terminal of FIG. 9 in accordance the second alternative technique.

As understood from FIG. 2, wireless terminal $26_1$ of FIG. 9 comprises terminal receiver section 46 and terminal processor 40. The terminal processor 40 in turn comprises terminal sidelink direct discovery controller 62. Example acts or steps performed by wireless terminal $26_1$ in conjunction with the second alternative technique Alt 2 are shown in FIG. 11. Act 11-1 comprises the receiver 46 obtaining a list of out-of-coverage radio resources from a Physical Sidelink Broadcast Channel (PSBCH). Act 11-1 more particularly comprises the terminal receiver section 46 receiving the Physical Sidelink Broadcast Channel (PSBCH), and the terminal sidelink direct discovery controller 62 obtaining the list of out-of-coverage radio resources from a Physical Sidelink Broadcast Channel (PSBCH). Act 11-2 comprises the wireless terminal using at least some of the out-of-coverage radio resources received from the PSBCH for sidelink direct discovery. For example the wireless terminal in performing act 11-2 may use at least some of the out-of-coverage radio resources received from the PSBCH for sidelink direct discovery when the wireless terminal is out-of-coverage. Use of the out-of-coverage radio resources received from the PSBCH for sidelink direct discovery may constitute either sending of a sidelink direct discovery announcement message, or monitoring for a sidelink direct discovery announcement message sent by another wireless terminal (e.g., second wireless terminal $26_2$).

Figure 12:
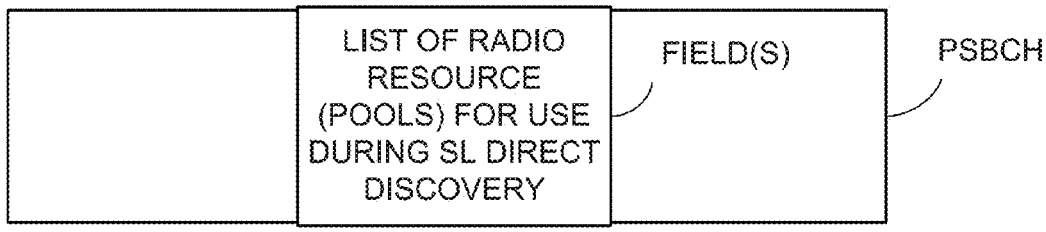
FIG. 12 is a diagrammatic view showing example Physical Sidelink Broadcast Channel (PSBCH) as including one or more fields or information elements for carrying the list of radio resource pool(s) of out-of-coverage resources for use in sidelink direct discovery.

FIG. 12 shows that a Physical Sidelink Broadcast Channel (PSBCH) may include one or more fields or information elements for carrying the list of radio resource pool(s) of out-of-coverage resources for use in sidelink direct discovery.

It should be understood that in some example embodiments and modes the list of out-of-coverage radio resources may be carried in a Physical Sidelink Broadcast Channel (PSBCH) associated with a sidelink direct communications sidelink synchronization signal (SLSS), but that in other example embodiments and modes the list of out-of-coverage radio resources may be carried in a Physical Sidelink Broadcast Channel (PSBCH) associated with a sidelink direct discovery sidelink synchronization signal (SLSS).

In another non-limiting example embodiment and mode, the Physical Sidelink Broadcast Channel (PSBCH) may be prepared to include other information besides the list of out-of-coverage radio resource pools, such as information comparable to information that may be carried in System Information Block (SIB) 19.

$3^{rd}$ Alternative (Alt 3): Resource Pool Indicated by Direct Discovery Signal In a third example alternative technique (Alt 3), an out-of-coverage wireless terminal that is capable of sidelink direct discovery and configured by upper layers to transmit sidelink direct discovery announcements may configure lower layers to transmit sidelink direct discovery announcements using resource pools originally obtained from in coverage system information, or obtained from some other out-of-coverage wireless terminals, or from preconfiguration information stored in the UICC or ME.

Additionally, as sub-alternatives to Alternative technique Alt 3 the out-of-coverage wireless terminal may also include further information in its discovery signal at some fixed position (time and/or frequency). Such position information may also be preconfigured in a memory, e.g., in resource pool memory 68 or in memory device 90 such as an UICC or ME of the wireless terminal. According to sub-alternative 3.1, the out-of-coverage wireless terminal may include resource pool information. According to sub-alternative 3.2, the out-of-coverage wireless terminal may include resource pool usage information (if such information is included, the out-of-coverage wireless terminal should update this information once it occupies some resource pools or releases some resource pools). Sub-alternative 3.3 is a combination of sub-alternative 3.1 and of sub-alternative 3.2.

An out-of-coverage wireless terminal capable of sidelink direct discovery that is configured by upper layers to monitor sidelink direct discovery announcements shall configure lower layers to monitor sidelink direct discovery announcements at the particularly fixed position (or just one particularly fixed resource pool), which may be preconfigured, e.g., in a memory such as resource pool memory 68 or in memory device 90.

The monitoring out-of-coverage wireless terminal decodes the resource pool information including Tx pools and Rx pools and thus decodes the whole out-of-coverage direct discovery announcement.

Such kind of resource pool information forwarding procedures can be associated with synchronization procedures. That is, the synchronization source which is capable of SL direct discovery may generate resource pool information (no matter from eNB or from itself), then other out-of-coverage wireless terminals are responsible for forwarding or updating such information during their OOC direct discovery operations.

Figure 13:
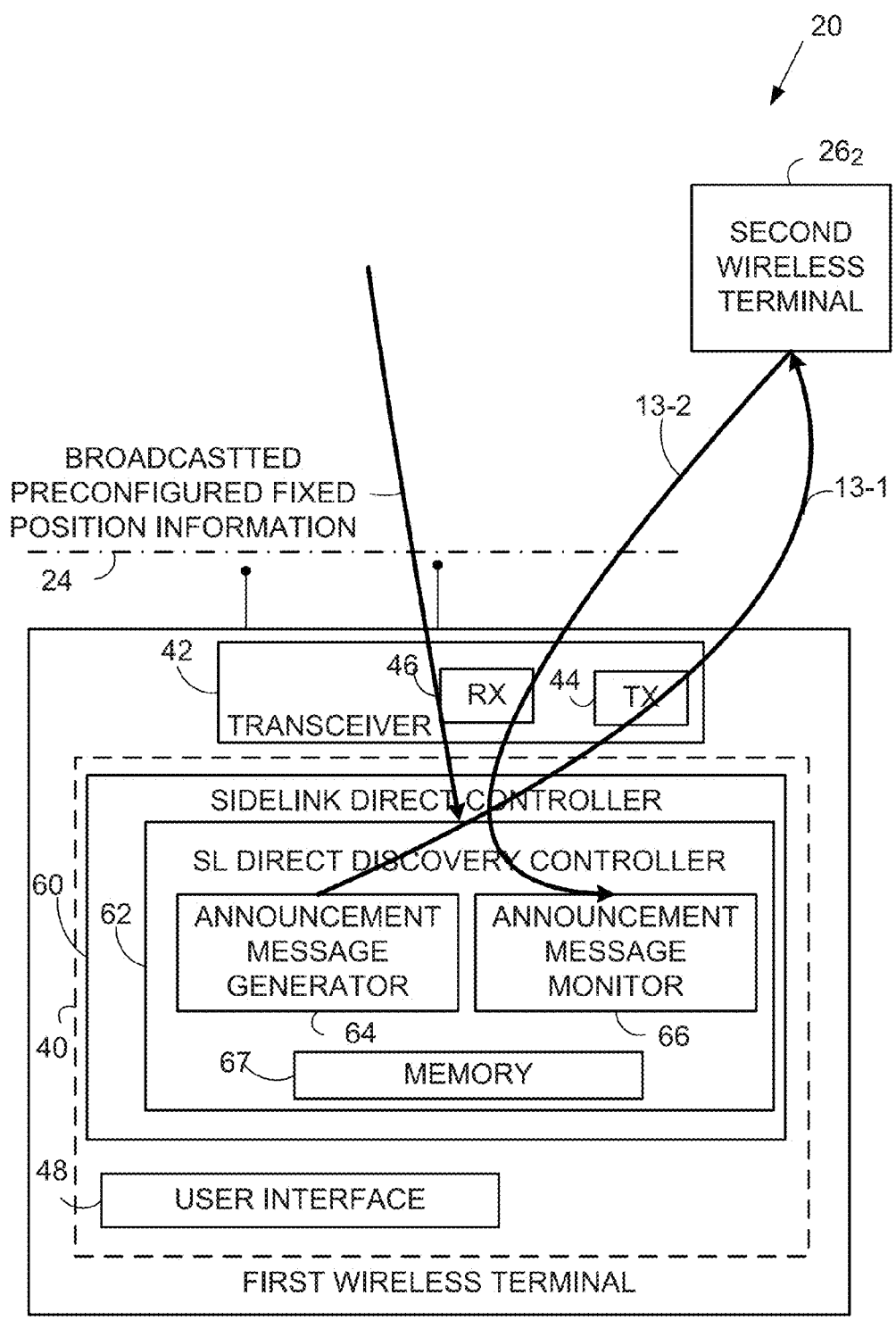
FIG. 13 is a schematic view of an example communications system wherein a wireless terminal uses a direct discovery signal according to a third alternative example technique.

FIG. 13 shows an example wireless terminal suitable for implementing Alternative technique Alt 3. As shown in FIG. 13 and understood also with reference to FIG. 2, the wireless terminal comprises memory device 67, terminal processor 40, and terminal transmitter section 44. The memory device 67 is pre-configured to include sidelink direct discovery fixed position information. The processor 40 is configured to generate, in accordance with the sidelink direct discovery fixed position information, a sidelink direct discovery announcement message which includes radio resource information for sidelink direct discovery. The transmitter 44 is configured to transmit the sidelink direct discovery announcement message including the radio resource information over a radio interface.

Figure 14:
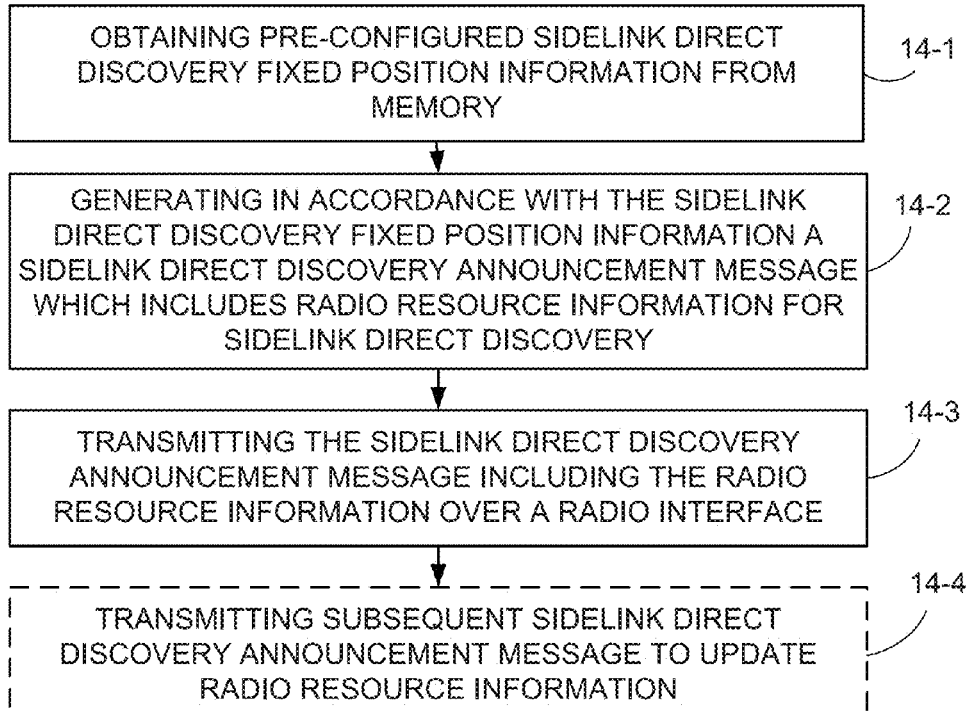
FIG. 14 is a flowcharting shows example basic acts or steps that may be performed by the wireless terminal of FIG. 13 in conjunction with sending a sidelink direct discovery announcement message for the third alternative technique Alt 3.

FIG. 14 shows example basic acts or steps that may be performed by the wireless terminal of FIG. 13 in conjunction with sending a sidelink direct discovery announcement message for the third alternative technique Alt 3. Act 14-1 comprises obtaining (e.g., from memory device 67 of the wireless terminal), pre-configured sidelink direct discovery fixed position information. Act 14-2 comprises generating, in accordance with the sidelink direct discovery fixed position information, a sidelink direct discovery announcement message which includes radio resource information for sidelink direct discovery. Act 14-3 comprises transmitting the sidelink direct discovery announcement message including the radio resource information over a radio interface. FIG. 13 depicts the direct discovery announcement message transmitted from wireless terminal $26_1$ to second wireless terminal $26_2$ as message 13-1.

Act 14-4 is an optional act, and comprises transmitting a subsequent sidelink direct discovery announcement message to update the pools of the list when the wireless terminal occupies or releases a pool of radio resources.

Figure 15:
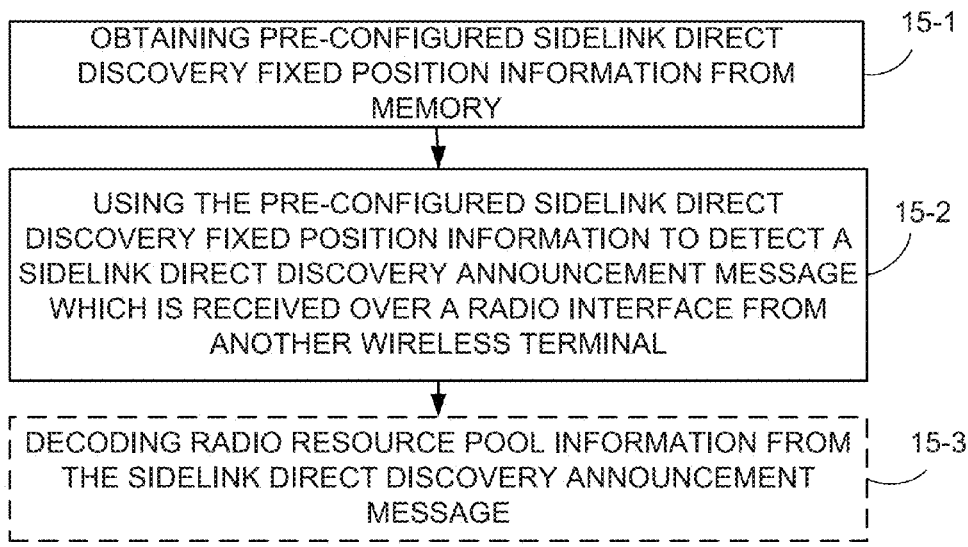
FIG. 15 is a flowcharting shows example basic acts or steps that may be performed by the wireless terminal of FIG. 13 in conjunction with monitoring a sidelink direct discovery announcement message for the third alternative technique Alt 3.

FIG. 15 shows example basic acts or steps that may be performed by the wireless terminal of FIG. 13 in conjunction with monitoring a sidelink direct discovery announcement message for the third alternative technique Alt 3. Act 15-1 comprises obtaining fixed position information from a memory (e.g., memory device 67) of the wireless terminal pre-configured sidelink direct discovery. Act 15-2 comprises using the pre-configured sidelink direct discovery fixed position information to detect (e.g., using announcement message monitor 66) a sidelink direct discovery announcement message which is received over a radio interface from another wireless terminal (e.g., second wireless terminal $26_2$). FIG. 13 depicts the direct discovery announcement message transmitted from wireless terminal $26_2$ to wireless terminal $26_1$ and monitored by wireless terminal $26_1$ as message 13-2. Act 15-3 comprises the wireless terminal decoding radio resource pool information from the sidelink direct discovery announcement message received from the other wireless terminal.

The sidelink direct discovery announcement message is preferably generated using the sidelink direct discovery fixed position information in a manner such that another wireless terminal, knowing the sidelink direct discovery fixed position information, is able to detect the sidelink direct discovery announcement message using the sidelink direct discovery fixed position information.

The radio resource information may comprise: (1) radio resource pool information; (2) radio resource pool usage information; or (3) a combination of (1) and (2).

Figure 16:
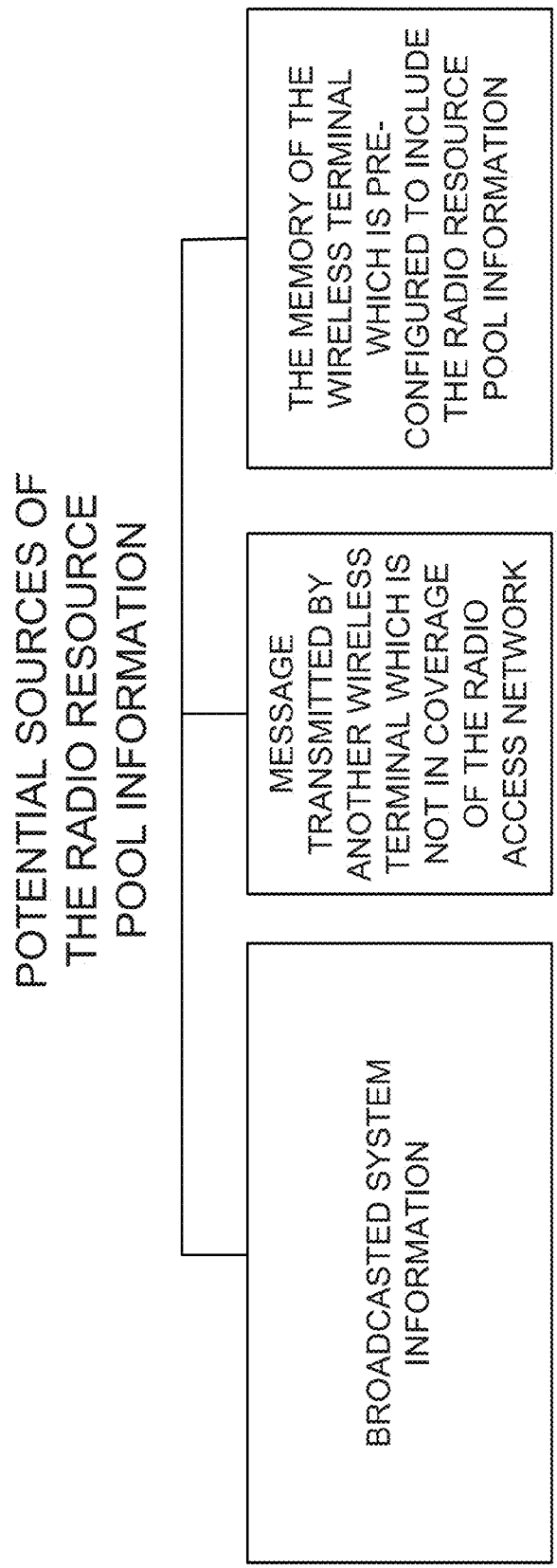
FIG. 16 is a diagrammatic view showing example sources from which radio resource pool information may be obtained.

As shown in FIG. 16, in an example embodiment and mode the method comprises obtaining the radio resource pool information from one or more of several sources. A first source is system information which is broadcast by an access node of a radio access network and received by the wireless terminal when the wireless terminal is in coverage of the radio access network or by another wireless terminal when the receiving wireless terminal is out-of-coverage. A second possible source is a message transmitted by another wireless terminal which is not in coverage of the radio access network, e.g., second wireless terminal $26_2$. A third potential source is the memory of the wireless terminal, which is pre-configured to include the radio resource pool information.

In an example embodiment and mode sidelink direct discovery fixed position information comprises time and/or frequency.

In an example embodiment and mode the method further comprises obtaining the pre-configured sidelink direct discovery fixed position information from a UICC or a ME (e.g., memory device 90 of FIG. 2) which is externally loaded into the wireless terminal, and which may be utilized or moved into memory device 67.

Combinations of Alternatives

The above three alternative techniques may work separately, i.e., each alternative technique may work alone for all out-of-coverage scenarios. Yet in other example embodiments and modes two or more of the above three alternatives may work together to be applicable for all out-of-coverage scenarios. For example, the preconfigured resource pools are default resource pools which the out-of-coverage wireless terminals may select for direct discovery announcements. However, if the out-of-coverage wireless terminals are discovered or synchronized by other out-of-coverage wireless terminals, and obtain the out-of-coverage resource pool information from other out-of-coverage wireless terminals, these wireless terminals should stop using preconfigured resource pools and use resource pools indicated by other out-of-coverage wireless terminals carrying such resource pool information.

Figure 17:
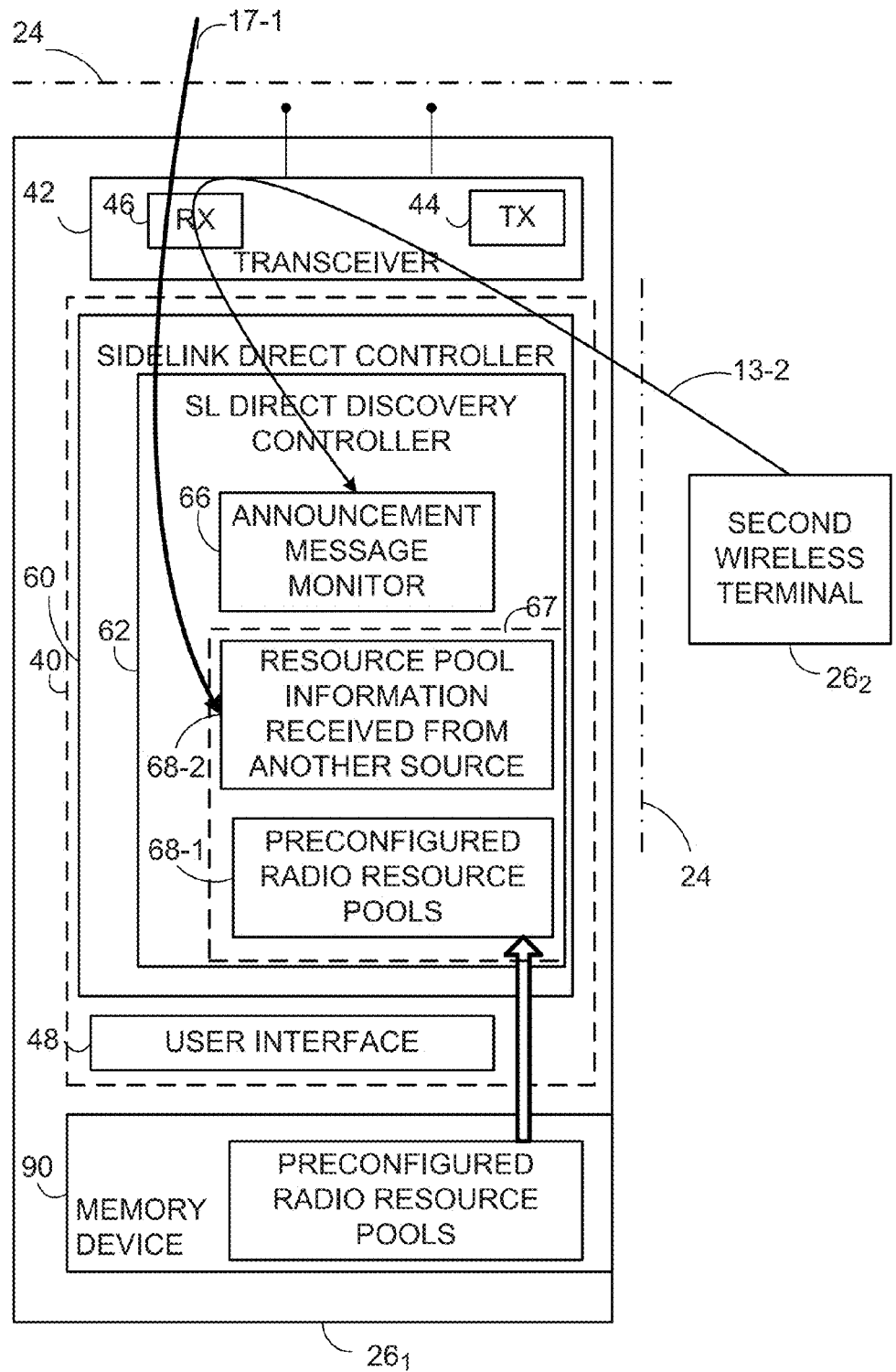
FIG. 17 is a schematic view of portions of an example communications system and particularly of a wireless terminal suitable for a combination of two or more alternative techniques for obtaining radio resource pools for an out-of-coverage wireless terminal.

FIG. 17 illustrates portions of an example communications system 20 suitable for a combination of two or more alternative techniques for obtaining radio resource pools for an out-of-coverage wireless terminal. The wireless terminal of FIG. 17 comprises memory device 67 and terminal processor 40. The terminal processor 40 is configured to store information pre-configured to enable the wireless terminal to participate in sidelink direct discovery, as represented by preconfigured radio resource pool 68-1 of FIG. 17. The processor 40 is configured to obtain the pre-configured information from the memory. However, when the wireless terminal subsequently obtains radio resource pool information from another source, e.g., any one of the sources shown in FIG. 16, the terminal processor 40 causes the wireless terminal to not use the pre-configured information, but instead to use the radio resource pool information obtained from the another source for participating in a sidelink direct discovery operation. The radio resource pool information obtained from the another source is shown as information 68-2 in FIG. 17.

In an example embodiment and mode, the preconfigured radio resource pool information stored as radio resource pool 68-1 may have obtained from a memory device 90 such as a UICC or ME which is externally loaded into the wireless terminal, and then loaded into resource pool memory 68-1 for utilization by terminal processor 40.

Figure 18:
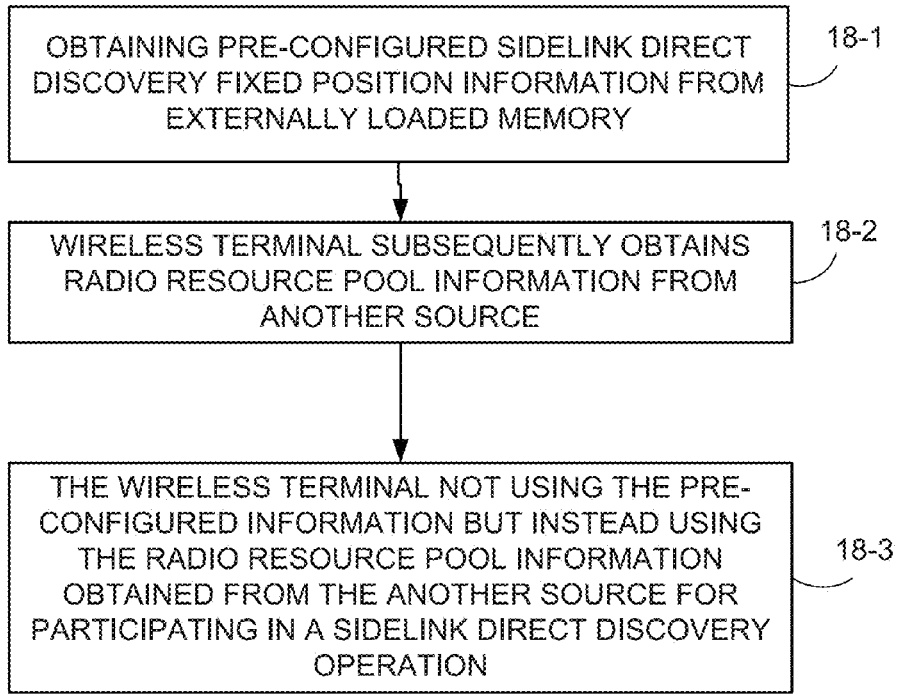
FIG. 18 is a flowchart showing illustrates basic, representative, acts or steps which may be performed in conjunction with a combination of alternative techniques.

FIG. 18 illustrates basic, representative, acts or steps which may be performed in conjunction with a combination of alternative techniques (e.g., Alt 1, Alt 2, and/or Alt 3). Act 18-1 comprises, when the wireless terminal is out of coverage of a radio access network, obtaining from a memory of the wireless terminal information pre-configured to enable the wireless terminal to participate in sidelink direct discovery. Act 18-2 comprises the wireless terminal subsequently obtaining radio resource pool information from another source. Act 18-3 comprises the wireless terminal not using the pre-configured information but instead using the radio resource pool information obtained from the other source for participating in a sidelink direct discovery operation.

In an example embodiment and mode the method further comprises obtaining the pre-configured information from a UICC or a ME which is externally loaded into the wireless terminal.

In an example embodiment and mode the pre-configured information comprises default radio resources for use in the sidelink direct discovery.

In an example embodiment and mode the pre-configured information comprises a fixed position at which the wireless terminal should monitor for a sidelink direct discovery announcement message from another wireless terminal, e.g., for example message 13-2 of FIG. 17.

In an example embodiment and mode the method further comprises, after obtaining the pre-configured information: the wireless terminal subsequently being discovered by another wireless terminal during sidelink direct discovery; the wireless terminal obtaining the radio resource pool information from the another wireless terminal as the other source; and the wireless terminal using the radio resource pool information obtained from the another wireless terminal for participating in the sidelink direct discovery operation.

In an example embodiment and mode the method further comprises, after obtaining the pre-configured information: the wireless terminal subsequently obtaining the radio resource pool information from an access node of a radio access network. FIG. 17 depicts as message 17-1 the obtaining of such radio resource pool information from an access node. Thereafter the wireless terminal using the radio resource pool information obtained from the access node for participating in the sidelink direct discovery operation. In an example embodiment and mode the method further comprises obtaining the radio resource pool information from a PSBCH broadcast by another wireless terminal, as understood with reference to Alt 2 discussed above.

Figure 19:
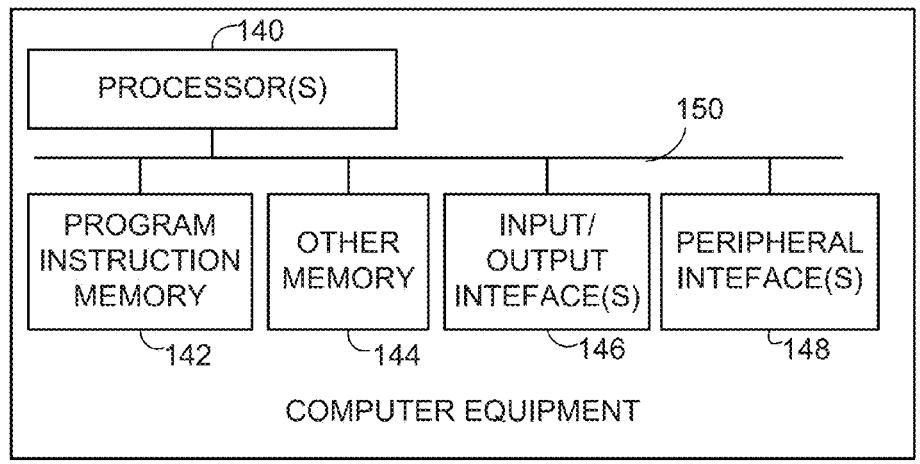
FIG. 19 is a diagrammatic view showing example electronic machinery which may comprise node electronic machinery or terminal electronic machinery.

Certain units and functionalities of node 22 and wireless terminal 26 framed by broken line are, in an example embodiment, implemented by electronic machinery or computer. FIG. 19 shows an example of such electronic machinery, whether node electronic machinery or terminal electronic machinery, as comprising one or more processors 140, program instruction memory 142; other memory 144 (e.g., RAM, cache, etc.); input/output interfaces 146; peripheral interfaces 148; support circuits 149; and busses 150 for communication between the aforementioned units.

The memory 144, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 149 are coupled to the processors 140 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method performed by a wireless terminal, the method comprising:
   using a processor to make a determination that the wireless terminal is out of network coverage;
   in accordance with the determination that the wireless terminal is out of coverage, using the processor to randomly select a resource from a pre-configured resource list;
   transmitting a sidelink direct discovery announcement using the selected resource.

2. The method of claim 1, further comprising selecting the selected radio resource from a pool of radio resources which is preconfigured in a memory of the wireless terminal.

3. The method of claim 2, wherein the pool of radio resources comprise pools of transmit radio resources and pools of receive radio resources, and wherein the pools of transmit radio resources and the pools of receive radio resources are co-extensive.

4. The method of claim 1, further comprising obtaining from the memory both (1) preconfigured radio frequency information for use in a sidelink direct discovery operation; and (2) a mapping of radio resources, which are to be obtained as the selected radio resources, to the preconfigured radio frequency information.

5. A wireless terminal comprising:
   a processor configured to:
      make a determination that the wireless terminal is out of network coverage;
      when the wireless terminal is out of network coverage, randomly select a resource from a pre-configured resource list;
   a transmitter configured to transmit a sidelink direct discovery announcement using the selected resource.

6. The wireless terminal of claim 5, further comprising a transceiver which under direction of the processor is configured to use the selected radio resource for a sidelink direct discovery operation.

7. A user equipment (UE) comprising:
   a processor; and
   a memory in electronic communication with the processor, wherein instructions stored in the memory are executable to:
      make a determination that the user equipment (UE) is out of coverage;
      randomly select, from a pre-configured resource list, a resource(s) in accordance with the determination that the user equipment (UE) is out of coverage;
      transmit a public safety sidelink direct discovery announcement using the selected resource(s).

8. The user equipment (UE) of claim 7, wherein the instructions are executable to randomly select the selected resource(s) in accordance with the determination that the user equipment (UE) is out of coverage and in accordance with a sidelink discovery transmission being configured.

9. A method in a user equipment (UE) comprising:
   using a processor to make a determination that the wireless terminal is out of coverage and to randomly select a resource(s), from a pre-configured resource list, in accordance with the determination that the wireless terminal is out of coverage; and
   transmitting a public safety sidelink direct discovery announcement using the selected resource(s).

10. The method (UE) of claim 9, further comprising using the processor to make the determination that the wireless terminal is out of coverage and to randomly select the selected resource(s) in accordance with the determination that the wireless terminal is out of coverage and in accordance with sidelink discovery transmission being configured.

* * * * *